US012762079B2

(12) United States Patent
Srivastava et al.

(10) Patent No.: US 12,762,079 B2
(45) **Date of Patent: *Oct. 13, 2026**

(54) SYSTEM FOR IMPLEMENTING OPERATIONS HAVING DYNAMICALLY-SIZED DATA STRUCTURES ON A RECONFIGURABLE PROCESSOR

(71) Applicant: SambaNova Systems, Inc., Palo Alto, CA (US)

(72) Inventors: Abhishek Srivastava, Sunnyvale, CA (US); Matthew Vilim, Redwood City, CA (US); Raghu Prabhakar, San Jose, CA (US); Sankar Rachuru, Palo Alto, CA (US); Zhekun Zhang, Palo Alto, CA (US); Matheen Musaddiq, Austin, TX (US); Apurv Vivek, Palo Alto, CA (US); Sitanshu Gupta, Palo Alto, CA (US); Ayesha Siddiqua, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 18/884,690

(22) Filed: Sep. 13, 2024

(65) Prior Publication Data

US 2025/0004971 A1 Jan. 2, 2025

Related U.S. Application Data

(63) Continuation of application No. 18/109,590, filed on Feb. 14, 2023, now Pat. No. 12,189,564.

(Continued)

(51) Int. Cl.
*G06F 13/40* (2006.01)

(52) U.S. Cl.
CPC ................................ *G06F 13/4059* (2013.01)

(58) Field of Classification Search
CPC .................................................. G06F 13/4059
See application file for complete search history.

(56) References Cited

U.S. PATENT DOCUMENTS 10,698,853 B1 6/2020 Grohoski et al.
10,768,899 B2 9/2020 Koeplinger et al.
(Continued)

FOREIGN PATENT DOCUMENTS

WO 2010142987 A1 12/2010

OTHER PUBLICATIONS

Koeplinger et al., Spatial: A Language and Compiler for Application Accelerators, PLDI '18, Jun. 18-22, 2018, Association for Computng Machinery, 16 pages.

(Continued)

*Primary Examiner* — Henry Tsai
*Assistant Examiner* — Harry Z Wang
(74) *Attorney, Agent, or Firm* — FP Patents; Sikander M. Khan; Joachim Erhard Pistorius

(57) ABSTRACT

A data processing system for implementing operations that generate a dynamically-sized output includes a reconfigurable processor that is configured to implement first and second operations and control circuitry. The first operation generates an output, whose size is unknown during a configuration phase. The second operation receives the output as an input. During a write operation, the first operation is enabled to write a first portion of the output to a first portion of a buffer, while the second operation reads a first portion of the input that is different than the first portion of the output from a second portion of the buffer that is different than the first portion of the buffer. The control circuity includes a control unit that: directs the second operation (Continued)

during a read operation following the write operation to read data as the input from the buffer that was stored during the write operation.

20 Claims, 14 Drawing Sheets

Related U.S. Application Data

(60) Provisional application No. 63/309,908, filed on Feb. 14, 2022.

(56) References Cited

U.S. PATENT DOCUMENTS

| | | | |
|---|---|---|---|
| 10,831,507 | B2 | 11/2020 | Shah et al. |
| 11,055,141 | B2 | 7/2021 | Prabhakar et al. |
| 11,126,574 | B1 | 9/2021 | Prabhakar et al. |
| 11,182,221 | B1 | 11/2021 | Sivaramakrishnan et al. |
| 11,182,264 | B1 | 11/2021 | Sivaramakrishnan et al. |
| 11,188,497 | B2 | 11/2021 | Shah et al. |
| 11,191,182 | B1 | 11/2021 | Wilson et al. |
| 11,195,080 | B1 | 12/2021 | Nama et al. |
| 11,200,096 | B1 | 12/2021 | Shenbagam et al. |
| 11,204,889 | B1 | 12/2021 | Prabhakar et al. |
| 11,227,207 | B1 | 1/2022 | Nama et al. |
| 11,232,360 | B1 | 1/2022 | Nama et al. |
| 11,237,880 | B1 | 2/2022 | Raumann et al. |
| 11,237,971 | B1 | 2/2022 | Brown et al. |
| 11,239,846 | B1 | 2/2022 | ur Rahman et al. |
| 11,250,061 | B1 | 2/2022 | Nama et al. |
| 11,250,105 | B2 | 2/2022 | Wang et al. |
| 11,256,987 | B1 | 2/2022 | Terakanambi Sheshadri et al. |
| 11,263,170 | B1 | 3/2022 | Nama et al. |
| 11,290,113 | B1 | 3/2022 | ur Rahman et al. |
| 11,290,114 | B1 | 3/2022 | ur Rahman et al. |
| 11,323,124 | B1 | 5/2022 | ur Rahman et al. |
| 11,327,771 | B1 | 5/2022 | Grohoski et al. |
| 11,327,923 | B2 | 5/2022 | Wang et al. |
| 11,328,209 | B1 | 5/2022 | Terakanambi Sheshadri et al. |
| 11,334,109 | B1 | 5/2022 | ur Rahman et al. |
| 11,366,783 | B1 | 6/2022 | Prabhakar et al. |
| 11,386,038 | B2 | 7/2022 | Prabhakar et al. |
| 11,392,740 | B2 | 7/2022 | Raumann et al. |
| 11,409,540 | B1 | 8/2022 | Grohoski et al. |
| 11,410,027 | B2 | 8/2022 | Chen et al. |
| 11,429,349 | B1 | 8/2022 | Oklobdzija et al. |
| 11,556,494 | B1 | 1/2023 | Grohoski et al. |
| 11,561,803 | B1 | 1/2023 | Zou et al. |
| 11,709,664 | B2 | 7/2023 | Chen et al. |
| 2004/0255088 | A1* | 12/2004 | Scheuerlein ......... G11C 7/1039 711/154 |
| 2014/0006748 | A1 | 1/2014 | Stewart et al. |
| 2014/0247835 | A1 | 9/2014 | Nordmark et al. |
| 2014/0351526 | A1* | 11/2014 | Peterson ............. G06F 13/1652 711/149 |
| 2017/0123794 | A1* | 5/2017 | Chen ..................... G06F 9/3858 |
| 2017/0177410 | A1* | 6/2017 | Laroche ................ G06F 9/5016 |
| 2020/0211148 | A1 | 7/2020 | Mackinnon |
| 2020/0348942 | A1* | 11/2020 | Döge .................. G06F 15/8046 |
| 2021/0055940 | A1 | 2/2021 | Shah et al. |
| 2021/0081691 | A1 | 3/2021 | Chen et al. |
| 2021/0096816 | A1 | 4/2021 | Wang et al. |
| 2021/0149634 | A1 | 5/2021 | Wang et al. |
| 2021/0157550 | A1 | 5/2021 | Wang et al. |
| 2021/0216873 | A1 | 7/2021 | Liu |
| 2021/0271519 | A1 | 9/2021 | Prabhakar et al. |
| 2021/0271630 | A1 | 9/2021 | Koeplinger et al. |
| 2022/0012077 | A1 | 1/2022 | Kumar et al. |
| 2022/0058034 | A1 | 2/2022 | Grohoski et al. |
| 2022/0092247 | A1 | 3/2022 | Koeplinger et al. |
| 2022/0269534 | A1 | 8/2022 | Misra et al. |
| 2022/0309027 | A1 | 9/2022 | Nama et al. |
| 2022/0309028 | A1 | 9/2022 | Nama et al. |
| 2022/0309316 | A1 | 9/2022 | Nama et al. |
| 2022/0309317 | A1 | 9/2022 | Nama et al. |
| 2022/0309318 | A1 | 9/2022 | Nama et al. |
| 2023/0011392 | A1 | 1/2023 | Zou et al. |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

SYSTEM FOR IMPLEMENTING OPERATIONS HAVING DYNAMICALLY-SIZED DATA STRUCTURES ON A RECONFIGURABLE PROCESSOR

RELATED APPLICATIONS AND DOCUMENTS

This application is a continuation application of commonly-assigned U.S. patent application Ser. No. 18/109,590, entitled, "Dynamically-Sized Data Structures on Data Flow Architectures," filed on Feb. 14, 2023, which claims the benefit of U.S. Provisional Patent Application No. 63/309,908, entitled, "Dynamically-Sized Data Structures on Data Flow Architectures" filed on 14 Feb. 2022. The priority application and the provisional application are hereby incorporated by reference herein in their entirety for all purposes.

This application also is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239,252, now U.S. Pat. No. 10,698,853 B1, filed Jan. 3, 2019, entitled "VIRTUALIZATION OF A RECONFIGURABLE DATA PROCESSOR;"

U.S. Nonprovisional patent application Ser. No. 16/862,445, now U.S. Pat. No. 11,188,497 B2, filed Apr. 29, 2020, entitled "VIRTUALIZATION OF A RECONFIGURABLE DATA PROCESSOR;"

U.S. Nonprovisional patent application Ser. No. 16/197,826, now U.S. Pat. No. 10,831,507 B2, filed Nov. 21, 2018, entitled "CONFIGURATION LOAD OF A RECONFIGURABLE DATA PROCESSOR;"

U.S. Nonprovisional patent application Ser. No. 16/198,086, now U.S. Pat. No. 11,188,497 B2, filed Nov. 21, 2018, entitled "CONFIGURATION UNLOAD OF A RECONFIGURABLE DATA PROCESSOR;"

U.S. Nonprovisional patent application Ser. No. 17/093,543, filed Nov. 9, 2020, entitled "EFFICIENT CONFIGURATION OF A RECONFIGURABLE DATA PROCESSOR;"

U.S. Nonprovisional patent application Ser. No. 16/260,548, now U.S. Pat. No. 10,768,899 B2, filed Jan. 29, 2019, entitled "MATRIX NORMAL/TRANSPOSE READ AND A RECONFIGURABLE DATA PROCESSOR INCLUDING SAME;"

U.S. Nonprovisional patent application Ser. No. 16/536,192, now U.S. Pat. No. 11,080,227 B2, filed Aug. 8, 2019, entitled "COMPILER FLOW LOGIC FOR RECONFIGURABLE ARCHITECTURES;"

U.S. Nonprovisional patent application Ser. No. 17/326,128, filed May 20, 2021, entitled "COMPILER FLOW LOGIC FOR RECONFIGURABLE ARCHITECTURES;"

U.S. Nonprovisional patent application Ser. No. 16/407,675, now U.S. Pat. No. 11,386,038 B2, filed May 9, 2019, entitled "CONTROL FLOW BARRIER AND RECONFIGURABLE DATA PROCESSOR;"

U.S. Nonprovisional patent application Ser. No. 16/504,627, now U.S. Pat. No. 11,055,141 B2, filed Jul. 8, 2019, entitled "QUIESCE RECONFIGURABLE DATA PROCESSOR;"

U.S. Nonprovisional patent application Ser. No. 17/322,697, filed May 17, 2021, entitled "QUIESCE RECONFIGURABLE DATA PROCESSOR;"

U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION;"

U.S. Nonprovisional patent application Ser. No. 16/744,077, filed Jan. 15, 2020, entitled "COMPUTATIONALLY EFFICIENT SOFTMAX LOSS GRADIENT BACKPROPAGATION;"

U.S. Nonprovisional patent application Ser. No. 16/590,058, now U.S. Pat. No. 11,327,713 B2, filed Oct. 1, 2019, entitled "COMPUTATION UNITS FOR FUNCTIONS BASED ON LOOKUP TABLES;"

U.S. Nonprovisional patent application Ser. No. 16/695,138, now U.S. Pat. No. 11,328,038 B2, filed Nov. 25, 2019, entitled "COMPUTATIONAL UNITS FOR BATCH NORMALIZATION;"

U.S. Nonprovisional patent application Ser. No. 16/688,069, filed Nov. 19, 2019, now U.S. Pat. No. 11,327,717 B2, entitled "LOOK-UP TABLE WITH INPUT OFFSETTING;"

U.S. Nonprovisional patent application Ser. No. 16/718,094, filed Dec. 17, 2019, now U.S. Pat. No. 11,150,872 B2, entitled "COMPUTATIONAL UNITS FOR ELEMENT APPROXIMATION;"

U.S. Nonprovisional patent application Ser. No. 16/560,057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME;"

U.S. Nonprovisional patent application Ser. No. 16/572,527, now U.S. Pat. No. 11,410,027 B2, filed Sep. 16, 2019, entitled "Performance Estimation-Based Resource Allocation for Reconfigurable Architectures;"

U.S. Nonprovisional patent application Ser. No. 15/930,381, now U.S. Pat. No. 11,250,105 B2, filed May 12, 2020, entitled "COMPUTATIONALLY EFFICIENT GENERAL MATRIX-MATRIX MULTIPLICATION (GEMM);"

U.S. Nonprovisional patent application Ser. No. 17/337,080, now U.S. Pat. No. 11,328,209 B1, filed Jun. 2, 2021, entitled "MEMORY EFFICIENT DROPOUT;"

U.S. Nonprovisional patent application Ser. No. 17/337,126, now U.S. Pat. No. 11,256,987 B1, filed Jun. 2, 2021, entitled "MEMORY EFFICIENT DROPOUT, WITH REORDERING OF DROPOUT MASK ELEMENTS;"

U.S. Nonprovisional patent application Ser. No. 16/890,841, filed Jun. 2, 2020, entitled "ANTI-CONGESTION FLOW CONTROL FOR RECONFIGURABLE PROCESSORS;"

U.S. Nonprovisional patent application Ser. No. 17/023,015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"

U.S. Nonprovisional patent application Ser. No. 17/031,679, filed Sep. 24, 2020, entitled "SYSTEMS AND

METHODS FOR MEMORY LAYOUT DETERMINATION AND CONFLICT RESOLUTION;"

U.S. Nonprovisional patent application Ser. No. 17/175,289, now U.S. Pat. No. 11,126,574 B1, filed Feb. 12, 2021, entitled "INSTRUMENTATION PROFILING FOR RECONFIGURABLE PROCESSORS;"

U.S. Nonprovisional patent application Ser. No. 17/371,049, filed Jul. 8, 2021, entitled "SYSTEMS AND METHODS FOR EDITING TOPOLOGY OF A RECONFIGURABLE DATA PROCESSOR;"

U.S. Nonprovisional patent application Ser. No. 16/922,975, filed Jul. 7, 2020, entitled "RUNTIME VIRTUALIZATION OF RECONFIGURABLE DATA FLOW RESOURCES;"

U.S. Nonprovisional patent application Ser. No. 16/996,666, filed Aug. 18, 2020, entitled "RUNTIME PATCHING OF CONFIGURATION FILES;"

U.S. Nonprovisional patent application Ser. No. 17/214,768, now U.S. Pat. No. 11,200,096 B1, filed Mar. 26, 2021, entitled "RESOURCE ALLOCATION FOR RECONFIGURABLE PROCESSORS;"

U.S. Nonprovisional patent application Ser. No. 17/127,818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127,929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185,264, filed Feb. 25, 2021, entitled "TIME-MULTIPLEXED USE OF RECONFIGURABLE HARDWARE;"

U.S. Nonprovisional patent application Ser. No. 17/216,647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216,650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/216,657, now U.S. Pat. No. 11,263,170 B1, filed Mar. 29, 2021, entitled "LOSSLESS TILING IN CONVOLUTION NETWORKS—PADDING BEFORE TILING, LOCATION-BASED TILING, AND ZEROING-OUT;"

U.S. Nonprovisional patent application Ser. No. 17/384,515, filed Jul. 23, 2021, entitled "LOSSLESS TILING IN CONVOLUTION NETWORKS—MATERIALIZATION OF TENSORS;"

U.S. Nonprovisional patent application Ser. No. 17/216,651, now U.S. Pat. No. 11,195,080 B1, filed Mar. 29, 2021, entitled "LOSSLESS TILING IN CONVOLUTION NETWORKS—TILING CONFIGURATION;"

U.S. Nonprovisional patent application Ser. No. 17/216,652, now U.S. Pat. No. 11,227,207 B1, filed Mar. 29, 2021, entitled "LOSSLESS TILING IN CONVOLUTION NETWORKS—SECTION BOUNDARIES;"

U.S. Nonprovisional patent application Ser. No. 17/216,654, now U.S. Pat. No. 11,250,061 B1, filed Mar. 29, 2021, entitled "LOSSLESS TILING IN CONVOLUTION NETWORKS—READ-MODIFY-WRITE IN BACKWARD PASS;"

U.S. Nonprovisional patent application Ser. No. 17/216,655, now U.S. Pat. No. 11,232,360 B1, filed Mar. 29, 2021, entitled "LOSSLESS TILING IN CONVOLUTION NETWORKS—WEIGHT GRADIENT CALCULATION;"

U.S. Nonprovisional patent application Ser. No. 17/364,110, filed Jun. 30, 2021, entitled "LOSSLESS TILING IN CONVOLUTION NETWORKS—TILING CONFIGURATION FOR A SEQUENCE OF SECTIONS OF A GRAPH;"

U.S. Nonprovisional patent application Ser. No. 17/364,129, filed Jun. 30, 2021, entitled "LOSSLESS TILING IN CONVOLUTION NETWORKS—TILING CONFIGURATION BETWEEN TWO SECTIONS;"

"U.S. Nonprovisional patent application Ser. No. 17/364,141, filed Jun. 30, 2021, entitled" "LOSSLESS TILING IN CONVOLUTION NETWORKS—PADDING AND RE-TILLING AT SECTION BOUNDARIES;"

U.S. Nonprovisional patent application Ser. No. 17/384,507, filed Jul. 23, 2021, entitled "LOSSLESS TILING IN CONVOLUTION NETWORKS—BACKWARD PASS;"

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP;"

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT;"

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT;"

U.S. Provisional Patent Application No. 63/190,749, filed May 19, 2021, entitled "FLOATING POINT MULTIPLY-ADD, ACCUMULATE UNIT WITH CARRY-SAVE ACCUMULATOR;"

U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"

U.S. Nonprovisional patent application Ser. No. 17/397,241, now U.S. Pat. No. 11,429,349 B1, filed Aug. 9, 2021, entitled "FLOATING POINT MULTIPLY-ADD, ACCUMULATE UNIT WITH CARRY-SAVE ACCUMULATOR;"

U.S. Nonprovisional patent application Ser. No. 17/216,509, now U.S. Pat. No. 11,191,182 B1, filed Mar. 29, 2021, entitled "UNIVERSAL RAIL KIT;"

U.S. Nonprovisional patent application Ser. No. 17/379,921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379,924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Nonprovisional patent application Ser. No. 17/378,342, now U.S. Pat. No. 11,556,494 B1, filed Jul. 16, 2021, entitled "DEFECT REPAIR FOR A RECONFIGURABLE DATA PROCESSOR;"

U.S. Nonprovisional patent application Ser. No. 17/378,391, now U.S. Pat. No. 11,327,771 B1, filed Jul. 16, 2021, entitled "DEFECT REPAIR CIRCUITS FOR A RECONFIGURABLE DATA PROCESSOR;"

U.S. Nonprovisional patent application Ser. No. 17/378,399, now U.S. Pat. No. 11,409,540 B1, filed Jul. 16, 2021, entitled "ROUTING CIRCUITS FOR DEFECT REPAIR FOR A RECONFIGURABLE DATA PROCESSOR;"

U.S. Provisional Patent Application No. 63/220,266, filed Jul. 9, 2021, entitled "LOGIC BIST AND FUNCTIONAL TEST FOR A CGRA;"

U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM;"

U.S. Nonprovisional patent application Ser. No. 17/338,620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH;"

U.S. Nonprovisional patent application Ser. No. 17/338,625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET;"

U.S. Nonprovisional patent application Ser. No. 17/338,626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES;"

U.S. Nonprovisional patent application Ser. No. 17/338,629, now U.S. Pat. No. 11,290,114 B1, filed Jun. 3, 2021, entitled "VARIABLE-LENGTH CLOCK STRETCHER WITH PASSIVE MODE JITTER REDUCTION;"

U.S. Nonprovisional patent application Ser. No. 17/405,913, now U.S. Pat. No. 11,334,109 B1, filed Aug. 18, 2021, entitled "VARIABLE-LENGTH CLOCK STRETCHER WITH COMBINER TIMING LOGIC;"

U.S. Provisional Patent Application No. 63/230,782, filed Aug. 8, 2021, entitled "LOW-LATENCY MASTER-SLAVE CLOCKED STORAGE ELEMENT;"

U.S. Provisional Patent Application No. 63/236,218, filed Aug. 23, 2021, entitled "SWITCH FOR A RECONFIGURABLE DATAFLOW PROCESSOR;"

U.S. Provisional Patent Application No. 63/236,214, filed Aug. 23, 2021, entitled "SPARSE MATRIX MULTIPLIER;"

U.S. Provisional Patent Application No. 63/389,767, filed Jul. 15, 2022. entitled "PEER-TO-PEER COMMUNICATION BETWEEN RECONFIGURABLE DATAFLOW UNITS;"

U.S. Provisional Patent Application No. 63/405,240, filed Sep. 9, 2022, entitled "PEER-TO-PEER ROUTE THROUGH IN A RECONFIGURABLE COMPUTING SYSTEM."

All of the related application(s) and documents listed above are hereby incorporated by reference herein for all purposes.

FIELD OF THE TECHNOLOGY DISCLOSED

The present technology relates to a data processing system, and more particularly, to a data processing system for implementing operations on a reconfigurable processor that generate a dynamically-sized output.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including FPGAs, can be configured to implement a variety of functions more efficiently or faster than might be achieved using a general-purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions.

Such reconfigurable processors, and especially CGRAs, often include specialized hardware elements such as computing resources and device memory that operate in conjunction with one or more software elements such as a CPU and attached host memory to implement low-latency and energy-efficient accelerators for applications such as machine learning and artificial intelligence workloads.

Typically, applications are executed on the reconfigurable processors in a distributed fashion by programming the individual compute and memory components to asynchronously receive, process, and send data and control information. In the reconfigurable processors, computation can be executed as deep, nested data flow pipelines that exploit nested parallelism and data locality very efficiently.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
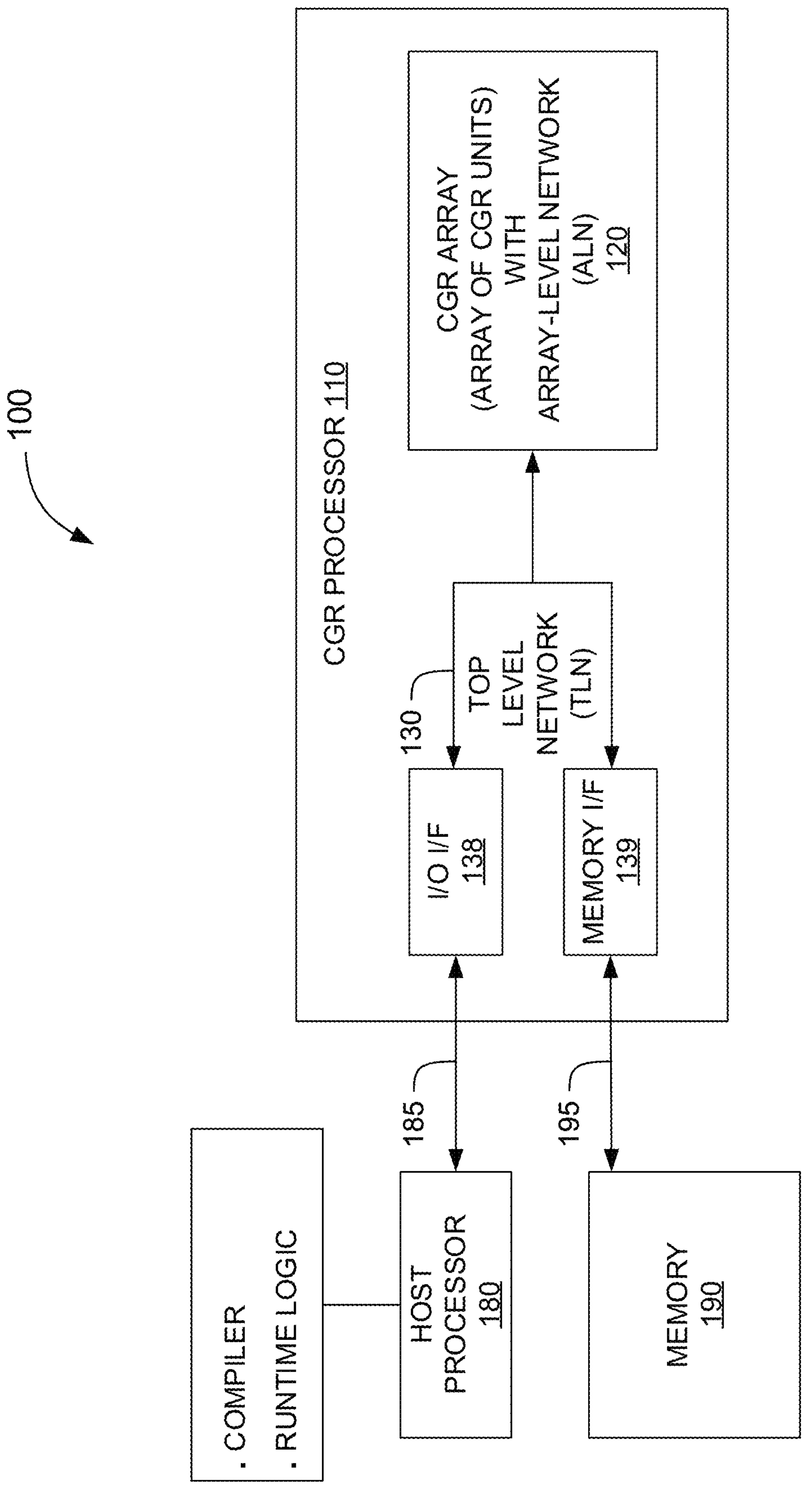
FIG. 1 is a diagram of an illustrative data processing system including a coarse-grained reconfigurable (CGR) processor, memory, and a host processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may benefit from massively parallel computations, where many parallel and interdependent threads (meta-pipelines) exchange data. Such programs are ill-suited for execution on Von Neumann computers. They benefit from architectures that enable parallel processing, such as coarse-grained reconfigurable architectures (CGRAs) or graphic processing units (GPUs).

Reconfigurable processors, and especially CGRAs, often include specialized hardware elements such as computing and memory units that operate in conjunction with one or more software elements such as a host processor and attached host memory to implement low-latency and energy-efficient accelerators for applications such as machine learning and artificial intelligence workloads.

Typically, applications are executed on the reconfigurable processors in a distributed fashion by programming the individual compute and memory units to asynchronously receive, process, and send data and control information. In the reconfigurable processors, computation can be executed as deep, nested data flow pipelines that exploit nested parallelism and data locality very efficiently.

These data flow pipelines contain several stages of computation, where each stage reads data from one or more input buffers with an irregular memory access pattern, performs computations on the data while using one or more internal buffers to store and retrieve intermediate results, and produce outputs that are written to one or more output buffers. The structure of these pipelines depends on the control and data flow graph representing the application. Pipelines can be arbitrarily nested and looped within each other.

The data flow graphs may be distilled from a high-level program and translated to a configuration file for the reconfigurable processor. A high-level program is source code written in programming languages like Spatial, Python, Java, JavaScript, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNext, RCNN, YOLO, SqueezeNet, SegNet, GAN, BERT, ELMo, USE, Transformer, and Transformer-XL.

A Software development kit (SDK) usually transforms the input behavioral description of the high-level programs of the applications into an intermediate representation such as computation graphs (e.g., data flow graphs, control graphs). The transformation from the high-level programs into the computation graphs may include code optimization steps like false data dependency elimination, dead-code elimination, and constant folding. The computation graphs encode the data and control dependencies of the high-level programs.

The computation graphs comprise nodes and edges. The nodes can represent compute operations and memory allocations. The edges can represent data flow and flow control. The computation graphs support branches, loops, function calls, and other variations of control dependencies. In some implementations, after the computation graphs are generated, additional analyses or optimizations focused on loop transformations can be performed, such as loop unrolling, loop pipelining, loop fission/fusion, and loop tiling.

A compiler transforms the computation graphs into a hardware-specific configuration, which is specified in an execution file generated by the compiler. Thereby, the compiler translates the applications into reconfigurable processor specifications.

While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or data flow graphs). This requirement implies that a compiler for a CGRA must decide which operation of a computation graph or data flow graph is assigned to which of the CGR units, and how both data and, related to the support of data flow graphs, control information flows among CGR units, and to and from host processor(s) and attached memory, while aiming for maximum bandwidth and minimum latency.

Illustrative functions or operations in machine learning applications include non-linearities like Rectified Linear Unit (ReLU) and its variants (e.g., leaky ReLU), hyperbolic tangent, sigmoid, and softmax, element-wise addition, matrix multiplication (e.g., General Matrix Multiply (GeMM)), layer normalization (e.g., batch normalization), loss functions like cross-entropy, and tensor shape modifiers like transpose. Such functions or operations operate on input data that can include scalar data (e.g., control bits) and vector data (e.g., vectors, tensors, matrices).

Usually, such functions or operations produce output data of a known format and size such as a scalar or vector data of a predetermined size (i.e., including a predetermined number of elements, each having a predetermined size). However, some functions or operations may produce output data of an unknown size. For example, the number of elements of an output vector or an output tensor may be undetermined at compile time and depend on the input data and on the function or operation.

It is desirable therefore to provide a support for dynamically-sized data structures on data flow architectures. In particular, it is desirable to provide a data processing system for implementing operations that generate such dynamically-sized data structures. For example, the data processing system may include a set of techniques for effectively handling an operation that is producing vector data (e.g., a vector or a tensor) with an unknown number of elements at compile time as well as effectively handling the operations downstream of that operation during the execution of the associated application on reconfigurable processors.

A data processing system for implementing operations that generate a dynamically-sized output is described. The data processing system is well-suited for applications like machine-learning (ML) and training of neural networks and includes a reconfigurable processor. If desired, the reconfigurable processor includes arrays of coarse-grained reconfigurable (CGR) units, which are sometimes also referred to as CGR arrays. Such a reconfigurable processor with arrays of CGR units is sometimes also referred to as a CGR processor.

The architecture, configurability, and data flow capabilities of an array of coarse-grained reconfigurable (CGR) units enable increased compute power that supports both parallel and pipelined computation. A CGR processor can be programmed (e.g., through configuration with a configuration file that has been distilled from a high-level program) to simultaneously execute multiple independent and interdependent data flow graphs.

FIG. 1 illustrates an example data processing system 100 including a CGR processor 110, a host processor 180, and an attached memory 190. As shown, CGR processor 110 has a coarse-grained reconfigurable architecture (CGRA) and includes an array of CGR units 120 such as a CGR array. CGR processor 110 may include an input-output (I/O) interface 138 and a memory interface 139. Array of CGR units 120 may be coupled with (I/O) interface 138 and memory interface 139 via databus 130 which may be part of a top-level network (TLN). Host processor 180 communicates with I/O interface 138 via system databus 185, and memory interface 139 communicates with memory 190 via memory bus 195.

Array of CGR units 120 may further include compute units and memory units that are interconnected with an array-level network (ALN) to provide the circuitry for execution of a computation graph or a data flow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, data flow graphs, models, deep learning applications, deep learning neural networks, programs, program images, jobs, tasks and/or any other procedures and functions that may perform serial and/or parallel processing.

In some implementations, execution of the graph(s) may involve using more than one CGR processor 110. In some implementations, CGR processor 110 may include one or more arrays of CGR units 120.

Host processor 180 may be, or include, a computer such as further described with reference to FIG. 2. Host processor 180 runs runtime processes or implements runtime logic, as further referenced herein. Therefore, host processor 180 or portions of host processor 180 are sometimes also referred to as a runtime processor. In some implementations, host processor 180 may also be used to run computer programs, such as the compiler further described herein with reference to FIG. 6. In some implementations, the compiler may run on a computer that is similar to the computer described with reference to FIG. 2, but separate from host processor 180.

CGR processor 110 may accomplish computational tasks by executing a configuration file (e.g., a processor-executable format (PEF) file). For the purposes of this description, a configuration file corresponds to a data flow graph, or a translation of a data flow graph, and may further include initialization data. A compiler compiles the high-level program to provide the configuration file. In some implementations described herein, a CGR array 120 is configured by programming one or more configuration stores with all or parts of the configuration file. Therefore, the configuration file is sometimes also referred to as a programming file.

A single configuration store may be at the level of the CGR processor 110 or the CGR array 120, or a CGR unit may include an individual configuration store. The configuration file may include configuration data for the CGR array and CGR units in the CGR array, and link the computation graph to the CGR array. Execution of the configuration file by CGR processor 110 causes the CGR array(s) to implement the user algorithms and functions in the data flow graph.

As an example, the CGR processor 110 may be configured to implement first and second operations, a recording unit, and a control unit. The first operation generates an output, whereby the size of the output is unknown during a configuration phase. The second operation receives the output of the first operation as an input. The recording unit generates control data that is indicative of the size of the output, and the control unit provides the control data to the second operation such that the second operation processes the input based on the control data. If desired, the arrays of CGR units 120 in the CGR processor 110 implement the first and second operations.

In some implementations, the recording unit may generate the control data while the first operation generates the output. For example, the recording unit may include a counter, and the counter may count a number of elements in the output to generate the control data.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
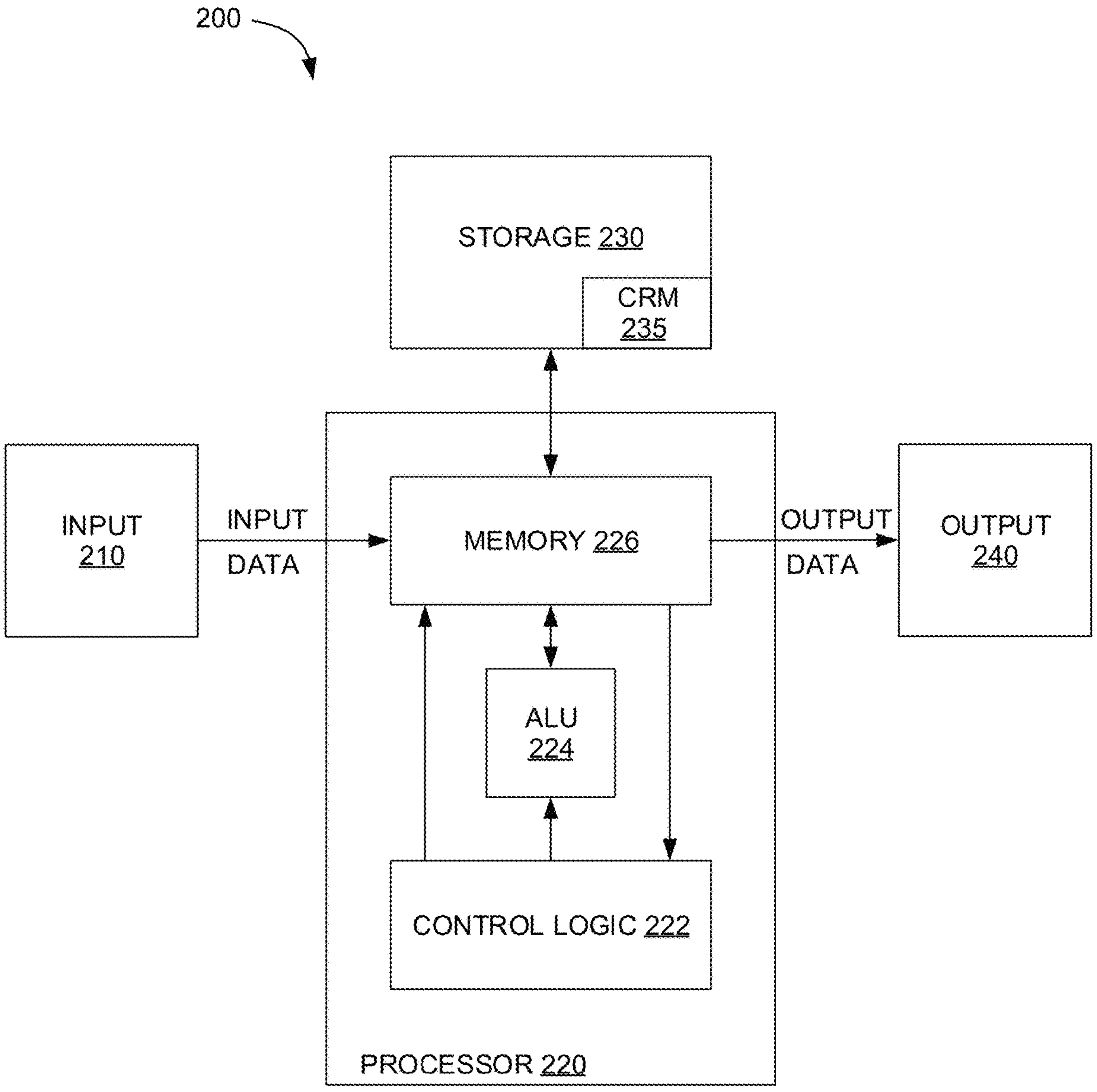
FIG. 2 is a diagram of an illustrative computer, including an input device, a processor, a storage device, and an output device.

FIG. 2 illustrates an example of a computer 200, including an input device 210, a processor 220, a storage device 230, and an output device 240. Although the example computer 200 is drawn with a single processor 220, other implementations may have multiple processors. Input device 210 may comprise a mouse, a keyboard, a sensor, an input port (e.g., a universal serial bus (USB) port), and/or any other input device known in the art. Output device 240 may comprise a monitor, printer, and/or any other output device known in the art. Illustratively, part or all of input device 210 and output device 240 may be combined in a network interface, such as a Peripheral Component Interconnect Express (PCIe) interface suitable for communicating with CGR processor 110 of FIG. 1.

Input device 210 is coupled with processor 220, which is sometimes also referred to as host processor 220) to provide input data. If desired, memory 226 of processor 220 may store the input data. Processor 220 is coupled with output device 240. In some implementations, memory 226 may provide output data to output device 240.

Processor 220 further includes control logic 222 and arithmetic and logic unit (ALU) 224. Control logic 222 may be operable to control memory 226 and ALU 224. If desired, control logic 222 may be operable to receive program and configuration data from memory 226. Illustratively, control logic 222 may control exchange of data between memory 226 and storage device 230. Memory 226 may comprise memory with fast access, such as static random-access memory (SRAM). Storage device 230 may comprise memory with slow access, such as dynamic random-access memory (DRAM), flash memory, magnetic disks, optical disks, and/or any other memory type known in the art. At least a part of the memory in storage device 230 includes a non-transitory computer-readable medium (CRM 235), such as used for storing computer programs. The storage device 230 is sometimes also referred to as host memory.

Figure 3:
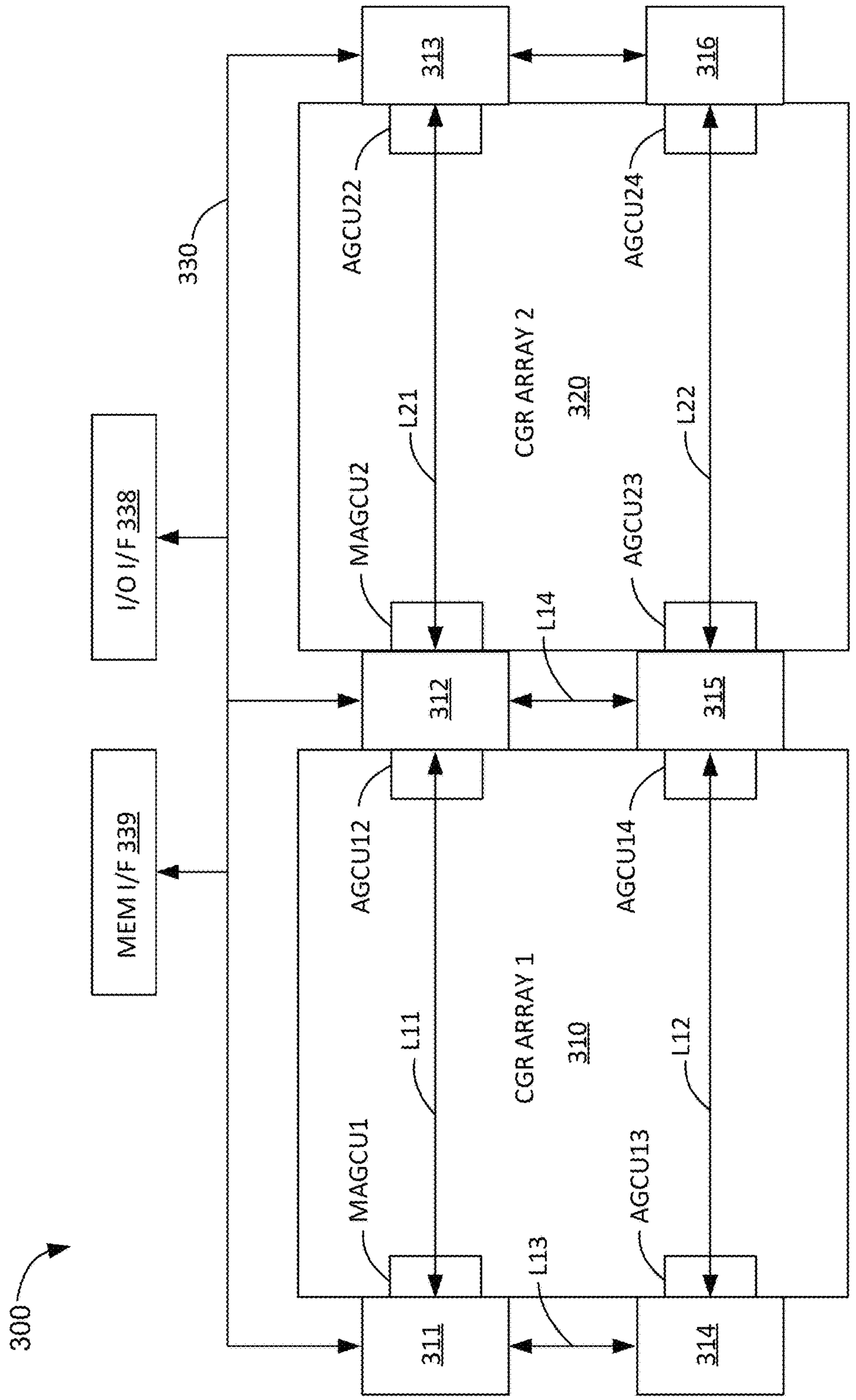
FIG. 3 is a diagram of an illustrative reconfigurable processor including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., pattern memory units (PMUs), pattern compute units (PCUs), fused-control memory units (FCMUs)) coupled via an array-level network (ALN), e.g., a bus system. The ALN may be coupled with the TLN 330 through several Address Generation and Coalescing Units (AGCUs), and consequently with input/output (I/O) interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN 330 and external devices, such as high-capacity memory, host processors, other CGR processors, FPGA devices, and so on, that may be coupled with the interfaces.

As shown in FIG. 3, each CGR array 310, 320 has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN 330 may be constructed using top-level switches (e.g., switch 311, switch 312, switch 313, switch 314, switch 315, and switch 316). If desired, the top-level switches may be coupled with at least one other top-level switch. At least some top-level switches may be connected with other circuits on the TLN, including the AGCUs, and external I/O interface 338.

Illustratively, the TLN 330 includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
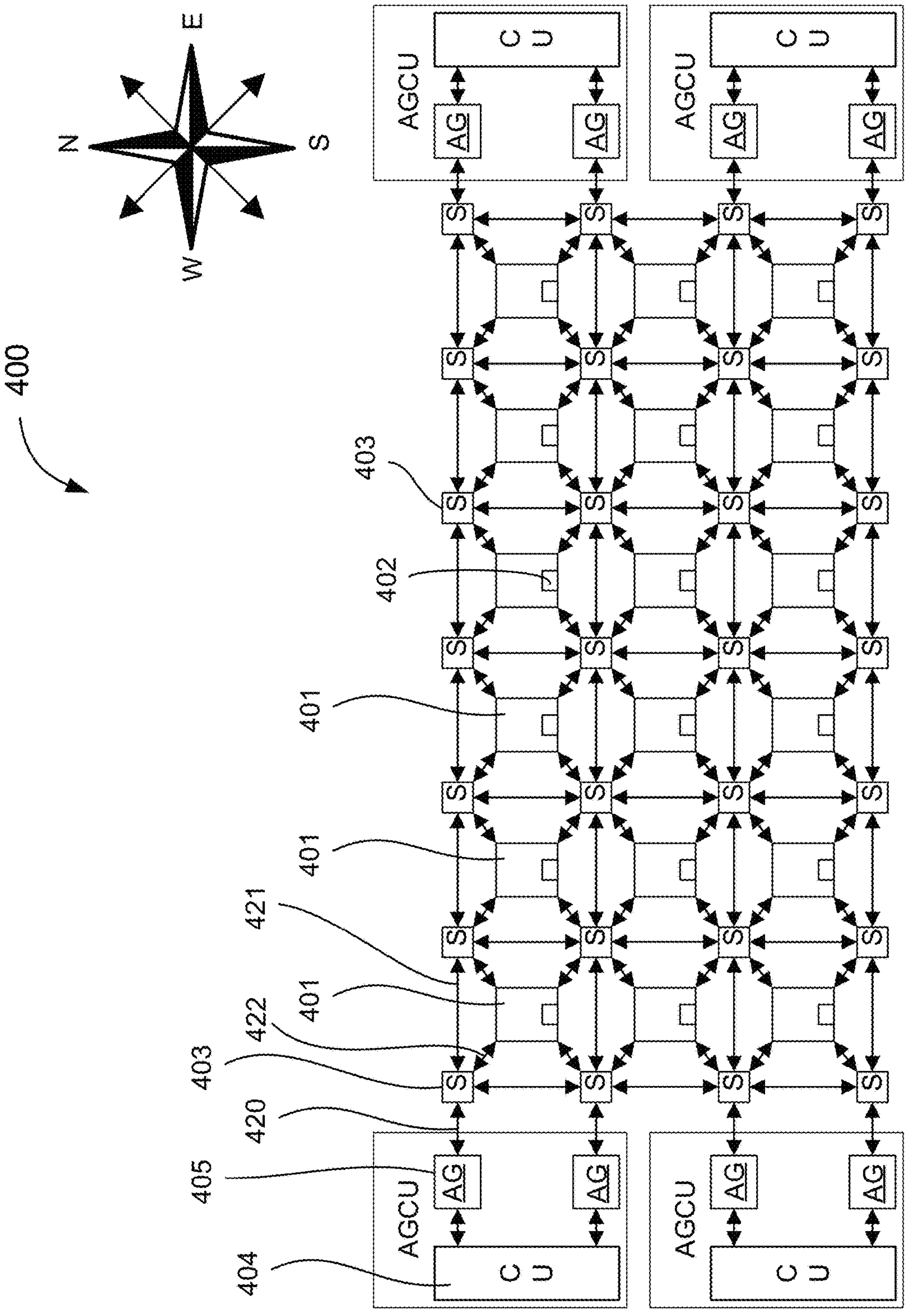
FIG. 4 is a diagram of an illustrative CGR array including CGR units and an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017 Jun. 24-28, 2017, Toronto, ON, Canada.

Illustratively, each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns.

The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections.

A configuration file may include configuration data representing an initial configuration, or starting state, of each of the CGR units 401 that execute a high-level program with user algorithms and functions or operations. Program load is the process of setting up the configuration stores 402 in the CGR array 400 based on the configuration data to allow the CGR units 401 to execute the high-level program. For example, the CGR units 401 may be configured to implement first and second operations. The first operation may generate an output of a size that is unknown during configuration with the configuration data, which is sometimes also referred to as the configuration phase. Program load may also require loading memory units and/or PMUs.

In some implementations, a runtime processor (e.g., the portions of host processor 180 of FIG. 1 that execute runtime processes) may perform the program load.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals.

The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest and Southwest interfaces of a switch unit 403 may each be used to make a link with an FCMU, PCU or PMU instance 401 using one of the interconnects 422. Two switch units 403 in each CGR array quadrant have links to an AGCU using interconnects 420. The coalescing unit 404 of the AGCU arbitrates between the AGs 405 and processes memory requests. Each of the eight interfaces of a switch unit 403 can include a vector interface, a scalar interface, and a control interface to communicate with the vector network, the scalar network, and the control network. In other implementations, a switch unit 403 may have any number of interfaces.

During execution of a graph or subgraph in a CGR array 400 after configuration, data can be sent via one or more switch units 403 and one or more links 421 between the switch units to the CGR units 401 using the vector bus and vector interface(s) of the one or more switch units 403 on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
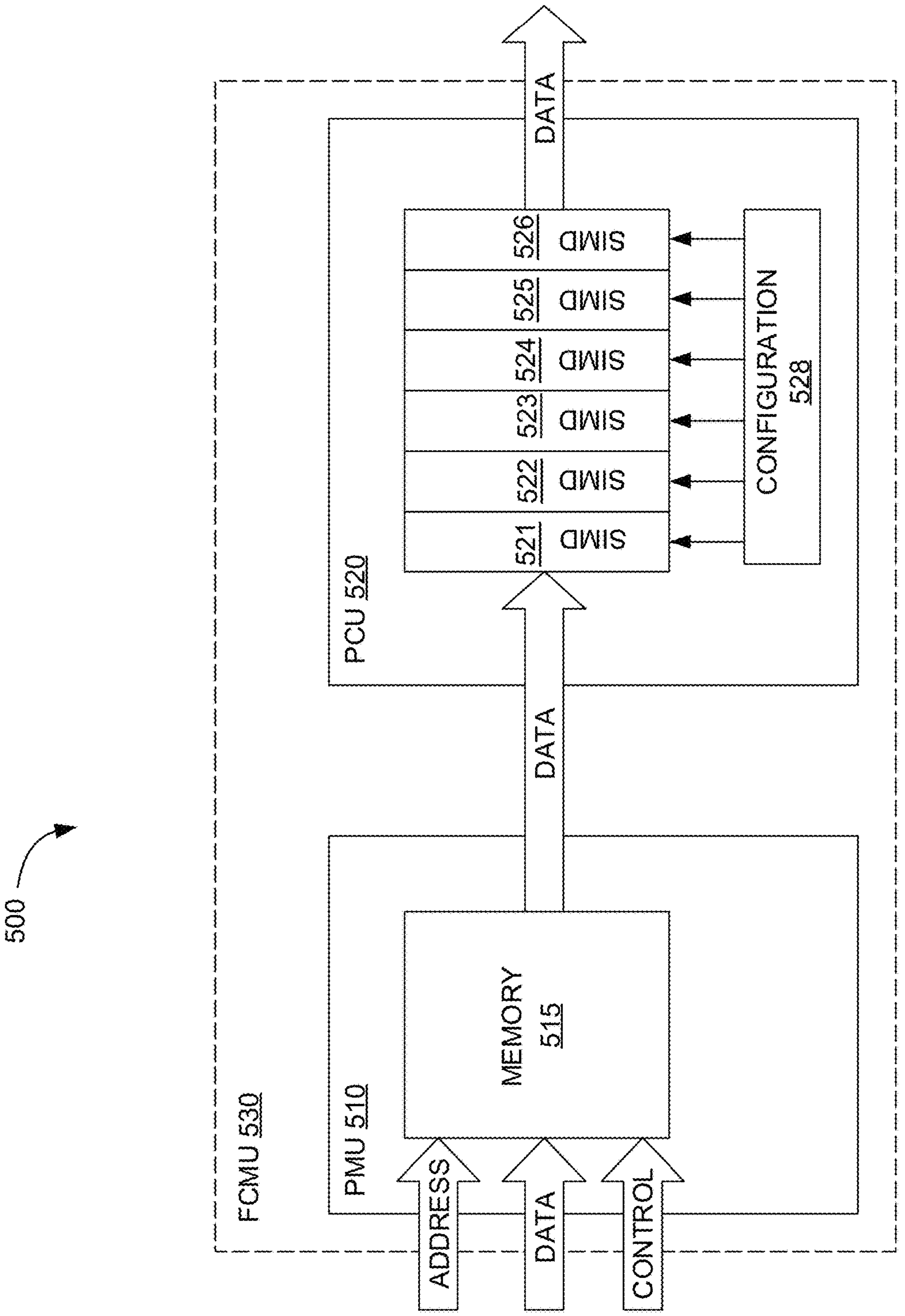
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (e.g., write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
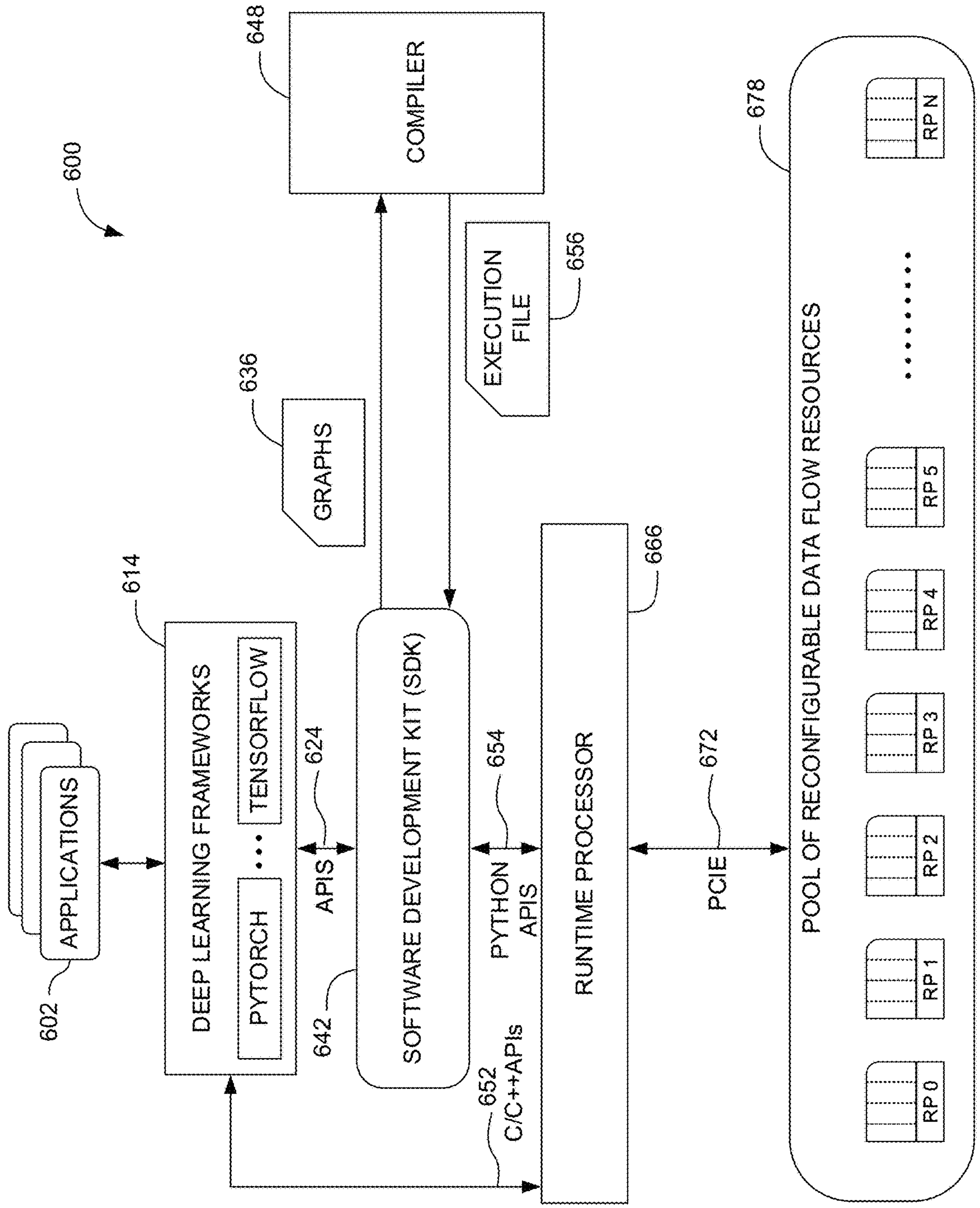
FIG. 6 is a diagram of an illustrative compute environment in which applications are provided a unified interface to a pool of reconfigurable data flow resources such that the pool of reconfigurable data flow resources is available to the applications as a single reconfigurable processor.

FIG. 6 shows a compute environment 600 that provides on-demand network access to a pool of reconfigurable data flow resources 678 that can be rapidly provisioned and released with minimal management effort or service provider interaction. The pool of reconfigurable data flow resources 678 includes memory (e.g., attached memory 190 of FIG. 1), arrays of CGR units, and busses (e.g., memory bus 195 of FIG. 1 and/or TLN 330 of FIG. 3) that couple the arrays of CGR units and the memory.

The busses or transfer resources enable the arrays of CGR units to receive and send data. Examples of the busses include peripheral component interface express (PCIe) channels, direct memory access (DMA) channels, double data-rate (DDR) channels, Ethernet channels, and InfiniBand channels. In some implementations, the busses include at least one of a DMA channel, a DDR channel, a PCIe channel, an Ethernet channel, or an InfiniBand channel.

The arrays of CGR units (e.g., arrays of compute units and memory units) are arranged in one or more reconfigurable processors (e.g., CGR processor 110 of FIG. 1) and may be coupled with each other in a programmable interconnect fabric (e.g., ALN 120 of FIG. 1). In some implementations, the arrays of CGR units are aggregated as a uniform pool of resources that are assigned to the execution of user applications.

The memory of the pool of reconfigurable data flow resources 678 may be usable by the arrays of CGR units to store data. Examples of the memory include main memory (e.g., off-chip/external dynamic random-access memory (DRAM)) and/or local secondary storage (e.g., local disks (e.g., hard disk drive (HDD), solid-state drive (SSD))). The memory units of the arrays of CGR units may include PMUs, latches, registers, and/or caches (e.g., SRAM).

The pool of reconfigurable data flow resources 678 is dynamically scalable to meet the performance objectives of applications 602 (or user applications 602). In some implementations, the applications 602 access the pool of reconfigurable data flow resources 678 over one or more networks (e.g., Internet).

The pool of reconfigurable data flow resources 678 may have different compute scales and hierarchies according to different implementations of the technology disclosed.

In one example, the pool of reconfigurable data flow resources 678 is a node (or a single machine) with arrays of CGR units that are arranged in a plurality of reconfigurable processors, supported by bus and memory. The node also includes a host processor (e.g., a CPU) that exchanges data with the plurality of reconfigurable processors, for example, over a PCIe interface. The host processor includes a runtime processor that manages resource allocation, memory mapping, and execution of the configuration files for applications requesting execution from the host processor.

In another example, the pool of reconfigurable data flow resources 678 is a rack (or cluster) of nodes, such that each node in the rack runs a respective plurality of reconfigurable processors, and includes a respective host processor configured with a respective runtime processor. The runtime processors are distributed across the nodes and communicate with each other so that they have unified access to the reconfigurable processors attached not just to their own node on which they run, but also to the reconfigurable processors attached to every other node in the data center.

The nodes in the rack are connected, for example, over Ethernet or InfiniBand (IB). In yet another example, the pool of reconfigurable data flow resources 678 is a pod that comprises a plurality of racks. In yet another example, the pool of reconfigurable data flow resources 678 is a superpod that comprises a plurality of pods. In yet another example, the pool of reconfigurable data flow resources 678 is a zone that comprises a plurality of superpods. In yet another example, the pool of reconfigurable data flow resources 678 is a data center that comprises a plurality of zones.

Users may execute applications 602 on the compute environment 600. Therefore, applications 602 are sometimes also referred to as user applications. The applications 602 are executed on the pool of reconfigurable data flow resources 678 in a distributed fashion by programming the individual compute and memory components to asynchronously receive, process, and send data and control information.

In the pool of reconfigurable data flow resources 678, computation can be executed as deep, nested data flow pipelines that exploit nested parallelism and data locality very efficiently. These data flow pipelines contain several stages of computation, where each stage reads data from one or more input buffers with an irregular memory access pattern, performs computations on the data while using one or more internal buffers or scratchpad memory to store and retrieve intermediate results, and produce outputs that are written to one or more output buffers. The structure of these pipelines depends on the control and data flow graph representing the application. Pipelines can be arbitrarily nested and looped within each other.

The applications 602 comprise high-level programs. A high-level program may include source code written in programming languages like C, C++, Java, JavaScript, Python, and/or Spatial, for example, using deep learning frameworks 614 such as PyTorch, TensorFlow, ONNX, Caffe, and/or Keras. The high-level program can implement computing structures and algorithms of machine learning models like AlexNet, VGG Net, GoogleNet, ResNet, ResNext, RCNN, YOLO, SqueezeNet, SegNet, GAN, BERT, ELMo, USE, Transformer, and/or Transformer-XL.

Software development kit (SDK) 642 generates computation graphs (e.g., data flow graphs, control graphs) 636 of the high-level programs of the applications 602. The SDK 642 transforms the input behavioral description of the high-level programs into an intermediate representation such as the computation graphs 636. This may include code optimization steps like false data dependency elimination, dead-code elimination, and constant folding. The computation graphs 636 encode the data and control dependencies of the high-level programs.

The computation graphs 636 comprise nodes and edges. The nodes can represent compute operations and memory allocations. The edges can represent data flow and flow control. In some implementations, each loop in the high-level programs can be represented as a "controller" in the computation graphs 636. The computation graphs 636 support branches, loops, function calls, and other variations of control dependencies. In some implementations, after the computation graphs 636 are generated, additional analyses or optimizations focused on loop transformations can be performed, such as loop unrolling, loop pipelining, loop fission/fusion, and loop tiling.

The SDK 642 also supports programming the reconfigurable data flow resources in the pool of reconfigurable data flow resources 678 at multiple levels, for example, from the high-level deep learning frameworks 614 to C++ and assembly language. In some implementations, the SDK 642 allows programmers to develop code that runs directly on the reconfigurable data flow resources. In other implementations, the SDK 642 provides libraries that contain predefined functions like linear algebra operations, element-wise tensor operations, non-linearities, and reductions that are used for creating, executing, and profiling the computation graphs 636 on the reconfigurable data flow resources. The SDK 642 communicates with the deep learning frameworks 614 via Application Programming Interfaces (APIs) 624.

A compiler 648 transforms the computation graphs 636 into a hardware-specific configuration, which is specified in an execution file 656 generated by the compiler 648. In one implementation, the compiler 648 partitions the computation graphs 636 into memory allocations and execution fragments, and these partitions are specified in the execution file 656. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as intended by the program. Different ones of the execution fragments can contain different amounts of computation. Execution fragments can represent parallel patterns or portions of parallel patterns and are executable asynchronously.

In some implementations, the partitioning of the computation graphs 636 into the execution fragments includes treating calculations within at least one innermost loop of a nested loop of the computation graphs 636 as a separate execution fragment. In other implementations, the partitioning of the computation graphs 636 into the execution fragments includes treating calculations of an outer loop around the innermost loop of the computation graphs 636 as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data used to implement the computation graphs 636, and these memory allocations are specified in the execution file 656. Memory allocations define the type and the number of hardware resources (functional units, storage, or connectivity components). Main memory (e.g., DRAM) is memory outside the reconfigurable processors for which the memory allocations can be made. Scratchpad memory (e.g., SRAM)

is memory inside the reconfigurable processors for which the memory allocations can be made. Other memory types for which the memory allocations can be made for various access patterns and layouts include read-only lookup-tables (LUTs), fixed size queues (e.g., FIFOs), and register files.

The compiler 648 binds memory allocations to virtual memory units and binds execution fragments to virtual compute units, and these bindings are specified in the execution file 656. In some implementations, the compiler 648 partitions execution fragments into memory fragments and compute fragments, and these partitions are specified in the execution file 656.

The compiler 648 assigns the memory fragments to the virtual memory units and assigns the compute fragments to the virtual compute units, and these assignments are specified in the execution file 656. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 648 allocates the virtual memory units to physical memory units of a reconfigurable processor (e.g., pattern memory units (PMUs) of the reconfigurable processor) and allocates the virtual compute units to physical compute units of the reconfigurable processor (e.g., pattern compute units (PCUs) of the reconfigurable processor), and these allocations are specified in the execution file 656. The compiler 648 places the physical memory units and the physical compute units onto positions in the arrays of CGR units of the pool of reconfigurable data flow resources and routes data and control networks between the placed positions, and these placements and routes are specified in the execution file 656.

The compiler 648 may translate the applications 602 developed with commonly used open-source packages such as Keras and/or PyTorch into reconfigurable processor specifications. The compiler 648 generates the configuration files with configuration data for the placed positions and the routed data and control networks. In one implementation, this includes assigning coordinates and communication resources of the physical memory and compute units by placing and routing units onto the arrays of the CGR units while maximizing bandwidth and minimizing latency.

A runtime processor 666 receives the execution file 656 from the SDK 642 and uses the execution file 656 for resource allocation, memory mapping, and execution of the configuration files for the applications 602 on the pool of reconfigurable data flow resources 678. The runtime processor 666 may communicate with the SDK 642 over APIs 654 (e.g., Python APIs). If desired, the runtime processor 666 can directly communicate with the deep learning frameworks 614 over APIs 652 (e.g., C/C++ APIs).

The runtime processor 666 may be operatively coupled to the pool of reconfigurable data flow resources 678 via a local bus 672. If desired, the local bus 672 may be a PCIe bus or any other local bus that enables the runtime processor 666 to exchange data with the pool of reconfigurable data flow resources 678.

The runtime processor 666 parses the execution file 656, which includes a plurality of configuration files. Configuration files in the plurality of configurations files include configurations of the virtual data flow resources that are used to execute the user applications 602. The runtime processor 666 allocates a subset of the arrays of CGR units in the pool of reconfigurable data flow resources 678 to the virtual data flow resources.

The runtime processor 666 then loads the configuration files for the applications 602 to the subset of the arrays of CGR units. In the scenario in which the execution file 656 includes two user applications 602 (e.g., a first and a second user application), the runtime processor 666 is configured to load a first configuration file for executing the first user application to a first subset of the arrays of CGR units in the pool of reconfigurable data flow resources 678, and to load a second configuration file for executing the second user application to a second subset of the arrays of CGR units in the pool of reconfigurable data flow resources 678. In some implementations, the memory and the arrays of CGR units of the one or more reconfigurable processors in the pool of reconfigurable data flow resources 678 are aggregated as a uniform pool of resources that are assigned to the execution of the first and second user applications 602. The runtime processor 666 then starts execution of the user applications 602 on the subsets of the arrays of CGR units.

An application for the purposes of this description includes the configuration files for reconfigurable data flow resources in the pool of reconfigurable data flow resources 678 compiled to execute a mission function procedure or set of procedures such as inferencing or learning in an artificial intelligence or machine learning system. A virtual machine for the purposes of this description comprises a set of reconfigurable data flow resources (including arrays of CGR units in one or more reconfigurable processor, bus, and memory) configured to support execution of an application in arrays of CGR units and associated bus and memory in a manner that appears to the application as if there were a physical constraint on the resources available, such as would be experienced in a physical machine. The virtual machine can be established as a part of the application of the mission function that uses the virtual machine, or it can be established using a separate configuration mechanism. In implementations described herein, virtual machines are implemented using resources of the pool of reconfigurable data flow resources 678 that are also used in the application, and so the configuration files for the application include the configuration data for its corresponding virtual machine, and links the application to a particular set of CGR units in the arrays of CGR units and associated bus and memory.

The runtime processor 666 implements an application in a virtual machine that is allocated a particular set of reconfigurable data flow resources. The virtual machine includes a particular set of CGR units, which can include some or all CGR units of a single reconfigurable processor or of multiple reconfigurable processors, along with associated bus and memory (e.g., PCIe channels, DMA channels, DDR channels, DRAM memory).

The runtime processor 666 respects the topology information (e.g., topology information 704 of FIG. 7) in the execution file 656 when allocating CGR units to the virtual data flow resources requested in the execution file 656.

The input and output memories as well as the compute units are configured for each operation at compile time. Thus, the sizes of the vector data of input and output of an operation is expected to be known at compile time.

However, as mentioned above, some functions or operations produce an output of a size that is unknown at compile time. As an example, consider the operation nonzero( ). In one implementation, the operation nonzero( ) receives an input tensor and returns a two-dimensional output tensor in which each row is the index for a non-zero value in the input tensor. Thus, if the input tensor has N dimensions and Z non-zero elements, the output tensor is of size (Z×N).

Figure 7:
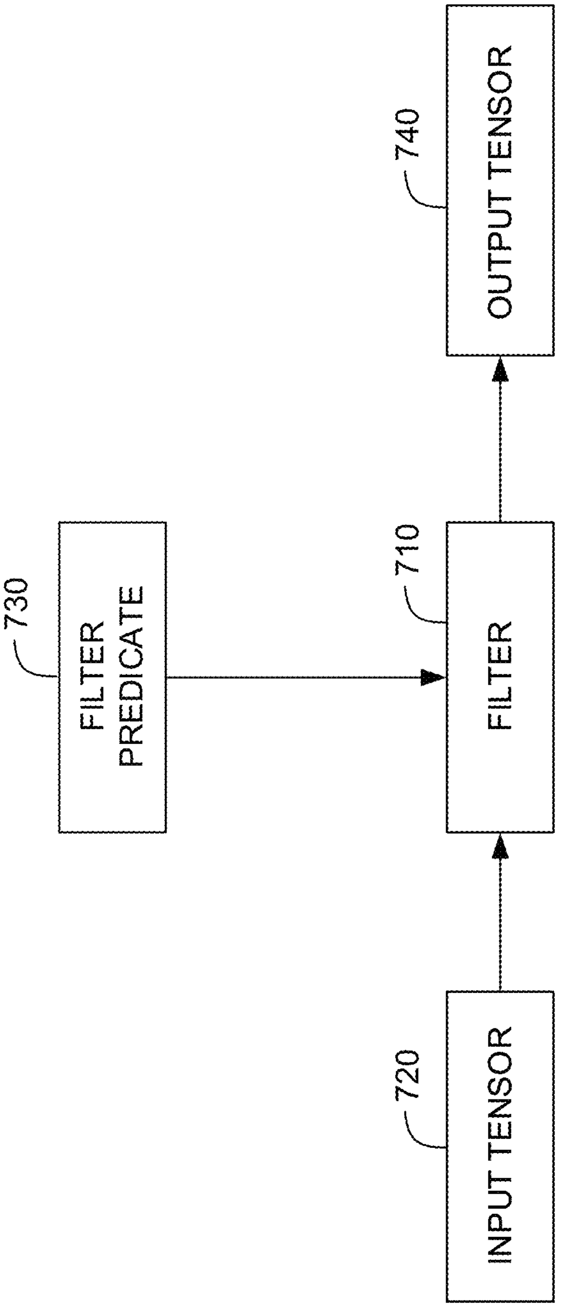
FIG. 7 is a diagram of an illustrative operation that generates a dynamically-sized output.

FIG. 7 is a diagram of an illustrative operation that generates an output of a size that is unknown at compile time. As shown in FIG. 7, the operation is a filter operation 710 that receives an input tensor 720 and generates an output tensor 740 containing elements that satisfy a predicate 730. In the scenario in which the input tensor 720 includes N elements, the filter operation 710 may produce an output tensor 740 that contains between 0 and N elements.

It should be noted that the terms "dynamically-sized data structure" and "tensor" or "output tensor" as well as the terms "operator that produces the dynamically-sized data structure" and "filter" are hereinafter used interchangeably for simplifying the discussion. However, one skilled in the art would appreciate that the described technology equally applies to operators other than filters which produce dynamically-sized data structures.

Figure 8:
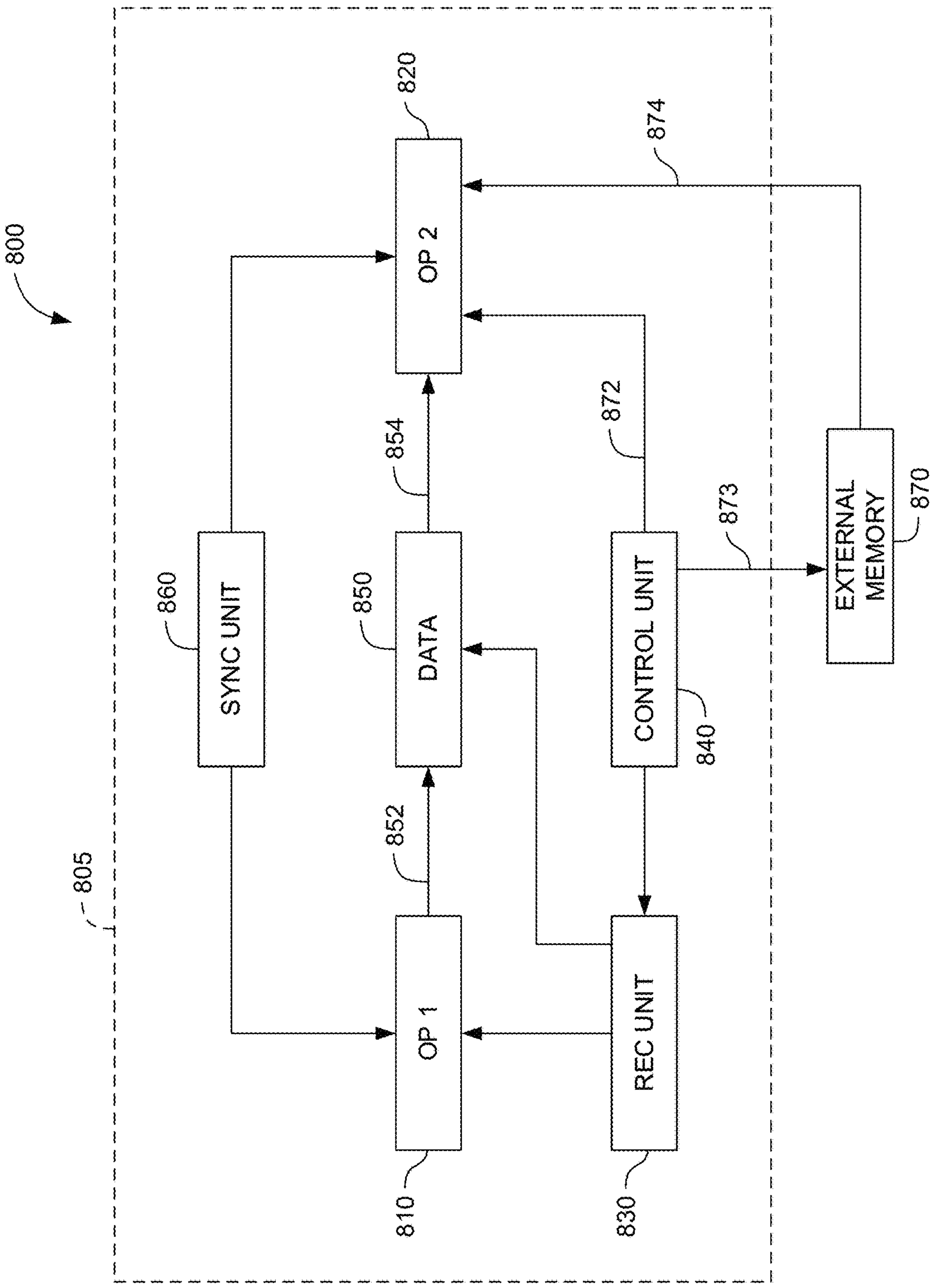
FIG. 8 is a diagram of an illustrative reconfigurable processor that is coupled to external memory and configured to implement an operation that generates a dynamically-sized output.

FIG. 8 is a diagram of an illustrative data processing system 800 with a reconfigurable processor 805 that is coupled to external memory 870. In some implementations, reconfigurable processor 805 is a CGR processor (e.g., CGR processor 110 of FIG. 1) that includes arrays of CGR units (e.g., CGR arrays 120 of FIG. 1) having memory units and compute units.

As shown in FIG. 8, the reconfigurable processor 805 is configured to implement an application. The application may include a first operation 810, a second operation 820, a recording unit 830, and a control unit 840.

Illustratively, a compiler (e.g., the compiler of FIG. 1) may generate configuration data for configuring the reconfigurable processor to implement the application including the first operation 810, the second operation 820, the recording unit 830, and the control unit 840.

Runtime logic (e.g., runtime logic operating on host processor 180 of FIG. 1) may be configured to program the reconfigurable processor 805 with the configuration data such that the reconfigurable processor 805 implements the application during a configuration phase. For example, the runtime logic may configure one or more compute units and/or memory units of the CGR arrays of the reconfigurable processor 805 to implement first and second operations 810, 820, recording unit 830, and control unit 840.

The first operation 810 may generate an output 852, and the second operation 820 may receive the output 852 as an input 854. In some implementations, the data of output 852 may be stored in one or more memory units 850, and the second operation 820 may read the data from the one or more memory units 850 as input 854.

The size of the output 852 may be unknown at compile time, and thus during the configuration phase during which the host processor (e.g., the runtime logic of host processor 180 of FIG. 1) configures the reconfigurable processor 805. For example, the first operation 810 may be a nonzero( ) or a filter operation as described with reference to FIG. 7.

In the scenario in which the first operation 810 (e.g., a filter operation) receives an input tensor having a predetermined number of elements (e.g., N elements), the output 852 of the first operation 810 may include a number of elements M that is smaller than or equal to a predetermined maximum number of elements, whereby the predetermined maximum number of elements is equal to the predetermined number of elements of the input tensor (i.e., M≤N). In this scenario, the compiler may generate in the configuration data a first connection for the output 852 and a second connection for the input 854, and each one of the first and second connections is suitable for a transmission of the predetermined maximum number of elements (i.e., N elements).

For storing the output 852 in memory 850, the compiler may allocate as much memory space (e.g., as many memory units 850) for the output 852 and for any subsequent memories downstream of the first operation 810 that are affected by the dynamically-sized output 852 as memory space is required for storing the input of the first operation 810. For routing the output 852 to any subsequent operations, the compiler may allocate interconnections that are able to transfer the same amount of data as the interconnection that conveys input data to the first operation 810.

If desired, the compiler may add control circuitry (e.g., recording unit 830 and control unit 840) to the first operation that produces the dynamically-sized output 852 at compile time. The reconfigurable processor 805 may be configured with the control circuitry for assisting with the execution of the application that includes the first operation 810 that produces dynamically-sized output 852.

The control circuitry may improve the efficiency of the execution of operations such as the second operation 820 that are downstream from the first operation that produces the dynamically-sized output 852. Moreover, the control circuitry may prevent that garbage data is read out of the one or more memory units 850 that store the dynamically-sized output 852 due to the dynamically-sized data of the output 852 potentially not writing to the entire memory space of the one or more memory units 850 that were allocated during compilation time.

Illustratively, the recording unit 830 may generate control data that is indicative of the size of the output 852 of the first operation 810. For example, the control data may be a scalar that includes the number of elements in the output 852.

In some implementations, the recording unit 830 may generate the control data while the first operation 810 generates the output. For example, the recording unit 830 may include a counter. The counter may count the number of elements in the output 852 to generate the control data. For example, the counter may access the first operation 810 and increment conditionally based on a predicate of the first operations 810 (e.g., when a filter adds a new element to the output 852). If desired, the control data may be a tuple. For example, the control data may include the number of elements and the size of each element of output 852.

In other implementations, the recording unit 830 may generate the control data by accessing the one or more memory units 850 to determine the size of the output 852 of the first operation 810.

Illustratively, the control unit 840 may fetch the control data from the recording unit 830. For example, the control unit 840 may fetch the control data from the recording unit 830 when the operator has finished executing the operation. In some implementations, the control mechanism may read out the value of the counter.

The control unit 840 may send the control data out onto the data network (e.g., the ALN of FIG. 1) to which the operations such as the second operation 820 that are consuming the output 852 of the first operation 810 (i.e., the consumers) are connected. As an example, the control unit 840 may send the control data to the second operation 820 over connection 872. As another example, the control unit 840 may store the control data in external memory 870 that is coupled to the reconfigurable processor 805 over connection 873, and the consumers including the second operation 820 may retrieve the control data from the external memory 870 over connection 874.

Illustratively, the reconfigurable processor 805 is configured to implement a synchronization unit 860. The synchronization unit 860 may inform the consumer of a dynamically-sized output when the producer of the dynamically-sized output has finished the operation. Thereby, the synchronization unit 860 may ensure that the consumer is prevented from using stale stored data. For example, the synchronization unit 860 may inform the second operation 820 when the first operation 810 has generated the output 852.

In some implementations, the data flow architectures of reconfigurable processor 805 may be heavily pipelined. For example, a compute unit that implements the first function 810 may receive an input from a memory unit and write the output 852 to another memory unit 850.

For example, the reconfigurable processor 805 may be configured to store the output 852 in a buffer (e.g., memory unit 850) during a write operation, and the control unit 840 may direct the second operation 820 during a read operation following the write operation to read data as the input 854 from the buffer 850 that was stored during the write operation.

Figure 9A:
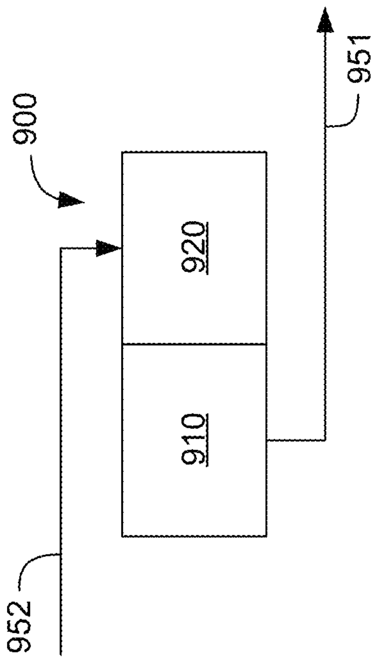
FIG. 9A is a diagram of an illustrative buffer with a write operation to a first portion of the buffer and a read operation from a second portion of the buffer.

In some scenarios, the memory unit 850 may operate as a multi-buffered meta-pipeline that allows readers (i.e., the second operation 820) and writers (i.e., the first operation 810) to operate on independent batches of the data. FIG. 9A is a diagram of an illustrative buffer 900. The address space of buffer 900 may be partitioned such that a write operation is performed at a first portion 920 of the buffer 900 and a read operation at a second portion 910 of the buffer 900. Such a buffer 900 is sometimes also referred to as a double buffer.

For example, the reconfigurable processor 805 of FIG. 8 may be configured to enable the first operation 810 to write a first portion of the output 952 to a first portion 920 of the buffer 900, while the second operation 820 reads a first portion of the input 951 that is different than the first portion of the output 952 from a second portion 910 of the buffer 900 that is different than the first portion 920 of the buffer 900.

When the first operation (e.g., operation 810 of FIG. 8) has finished writing the first portion 952 of the output and the second operation (e.g., operation 820 of FIG. 8) has finished reading the first portion 951 of the input, the addresses of the first and second portions may swap.

Figure 9B:
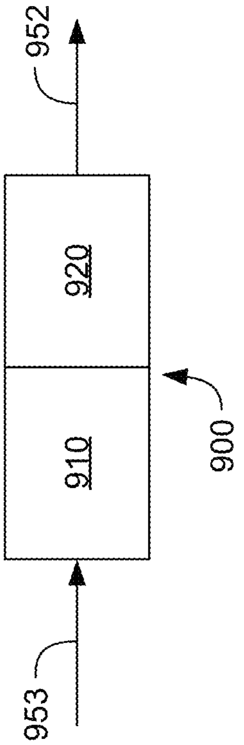
FIG. 9B is a diagram of the illustrative buffer of FIG. 9A with a write operation to the second portion of the buffer and a read operation from the first portion of the buffer.

Thus, the reconfigurable processor (e.g., reconfigurable processor 805 of FIG. 8) is configured to enable the first operation (e.g., operation 810 of FIG. 8) to write a second portion 953 of the output to the second portion 910 of the buffer 900 (e.g., memory units 850 of FIG. 8), while the second operation (e.g., operation 820 of FIG. 8) reads the first portion 952 of the output from the first portion 920 of the buffer 900 as a second portion of the input. This is illustratively shown in FIG. 9B.

Figure 10:
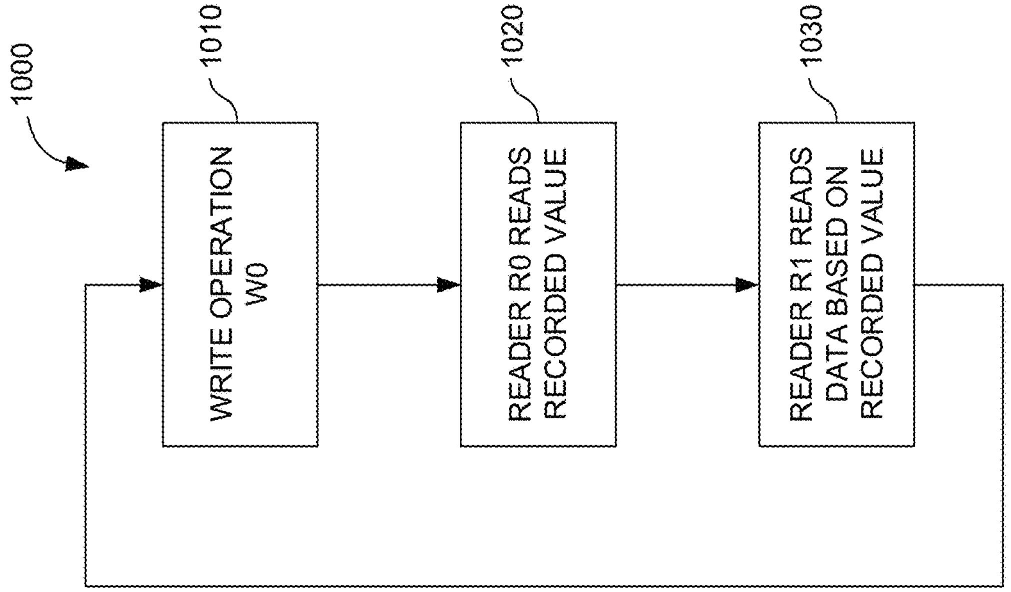
FIG. 10 is a diagram of illustrative dependencies between read and write operations of the control unit.

FIG. 10 is a diagram of illustrative dependencies between read and write operations in a reconfigurable processor that is configured to implement a function that generates a dynamically-sized output as shown in FIG. 8.

A first operation may generate a dynamically-sized output that is written to a memory unit during a write operation 1010. If desired, a recording unit may write control data that is indicative of the size of the dynamically-sized output of the first operation to the memory unit at the end of the first operation.

For example, the first function 810 of FIG. 8 may generate dynamically-sized output 852 that is written to memory unit 850 during a write operation. If desired, recording unit 830 may write control data that is indicative of the size of the output 852 of the first operation 810 to the memory unit 850 at the end of the write operation.

During read operation 1020, reader R0 may read the contents of the control data (e.g., a scalar). In some implementations, reader R0 may push the control data into the data network. In other implementations, reader R0 may write the control data to external storage. For example, the control unit 840 of FIG. 8 may retrieve the control data from the recording unit 830 and send the control data directly to the second operation 820 over connection 872, or the control data may write the control data over connection 873 to the external memory 870 from which the second operation 820 may retrieve the control data over connection 874.

Once reader R0 has finished reading the contents of the control data and informed downstream operations, reader R0 may hand the control to another reader R1. Reader R1 actually performs the data read from the memory unit during operation 1030. For example, control unit 840 of FIG. 8 may hand the control to second operation 820, and the second operation 820 may perform the data read from the memory unit 850.

Figure 11:
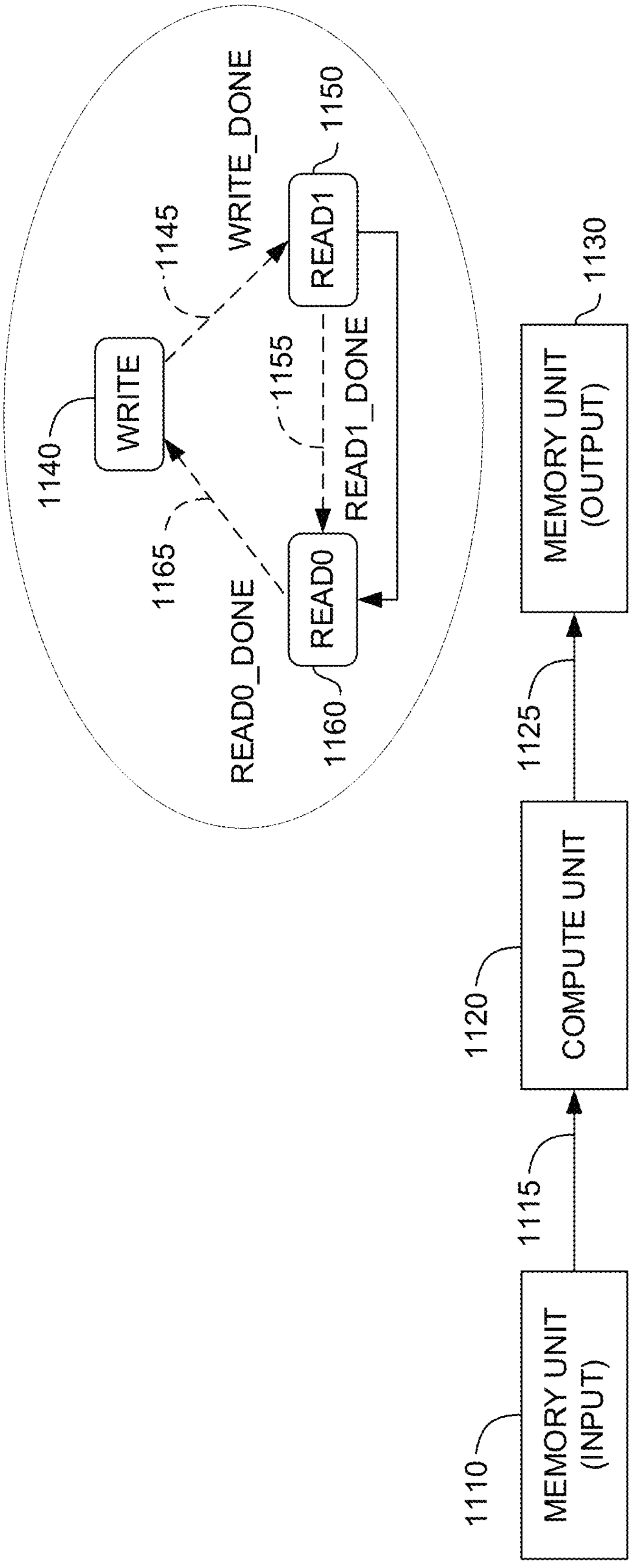
FIG. 11 is a diagram of an illustrative implementation of an illustrative filter operation and associated control circuitry on a reconfigurable processor.

Illustratively, the filter operation shown in FIG. 7 may be implemented together with control circuitry on a reconfigurable processor as shown in FIG. 11. As shown in FIG. 11, the filter 710 of FIG. 7 may be implemented in compute unit 1120 of the reconfigurable processor, while the input tensor 720 is stored in memory unit 1110 and output tensor 740 is stored in memory unit 1130 of the reconfigurable processor. In some implementations, the reconfigurable processor may be configured to implement control circuitry (e.g., a recording unit that generates control data that is indicative of the size of the output tensor that is stored in output memory unit 1130 and a control unit that communicates the control data to compute units downstream of the output memory unit 1130).

In some implementations, the recording unit may be implemented using counters. For example, consider the scenario in which the input memory unit 1110 stores a statically-sized tensor of a predetermined size. In this scenario, the output memory unit 1130 may maintain a counter with a maximum value that is set to the predetermined size of the input tensor. The counter stride may be set by an external scalar port that receives the filter predicate (e.g., filter predicate 730 of FIG. 7). When the counter reaches the maximum value, a context change occurs that reads the current counter value and uses the current counter value to set the maximum value of the read context.

For example, compute unit 1120 may retrieve input data 1115 from input memory unit 1110. During a write operation 1140, compute unit 1120 may write data 1125 to output memory unit 1130. Simultaneously, the recording unit may store a current counter value in the output memory unit 1130. When the write operation 1140 finishes, compute unit 1120 and/or output memory unit 1130 may issue a WRITE_DONE signal 1145.

Upon issuance of the WRITE_DONE signal 1145, a control unit may perform a read operation READ1 1150 to retrieve the current counter value from the output memory unit 1130 and transmit the current counter value to a compute unit downstream of the output memory unit 1130 for read operation READ0 1160. The read operation READ1 1150 may issue a READ1_DONE signal 1155 when the current counter value has been transmitted to compute unit downstream of the output memory unit 1130.

Upon issuance of the READ1_DONE signal 1155, the compute unit that is downstream of the output memory unit 1130 may, during read operation READ0 1160, retrieve the content of the output memory unit 1130 using the current counter value. When the read operation READ0 1160 has finished, the read operation READ0 1160 may issue a READ0_DONE signal 1165 so that another write operation WRITE 1140 may start.

Thus, read operation READ1 1150 is blocked by write operation WRITE 1140, which in turn blocks read operation READ0 1160. Thereby, the control circuitry ensures that read operation READ0 1160 uses the actual output size of the output tensor in output memory unit 1130.

Illustratively, the size of output data 1125 (i.e., the current counter value) at the end of the write operation performed by compute unit 1120 may be communicated to all downstream operations. The downstream operations may use the current counter value to set the maximum values of their counters in the same way as the filter operation does. If desired, the output tensor size may be stored in external memory (e.g., DRAM) such as external memory 870 of FIG. 8.

Figure 12:
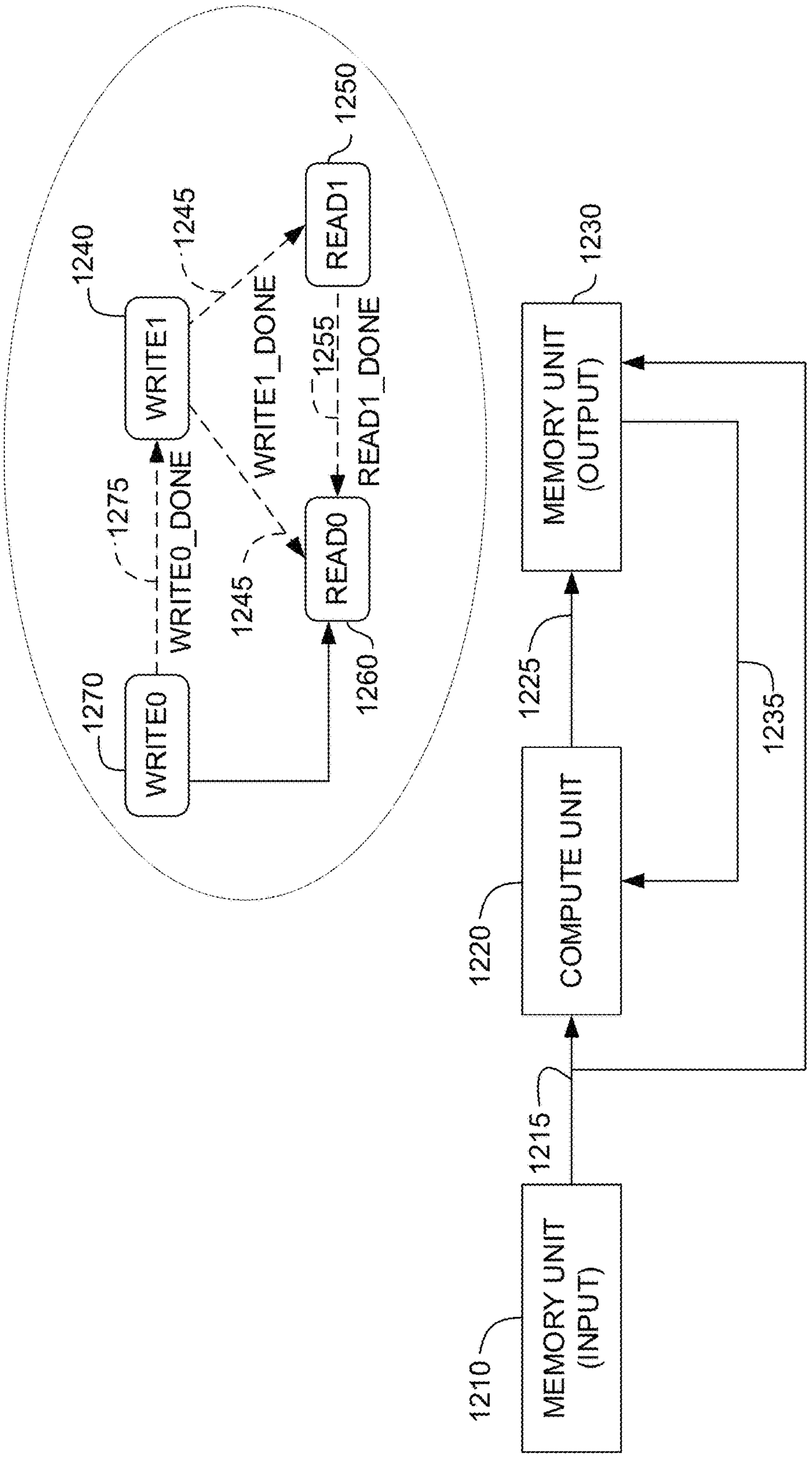
FIG. 12 is a diagram of an illustrative implementation of an illustrative group-by operation and associated control circuitry on a reconfigurable processor.

FIG. 12 is a diagram of an illustrative implementation of an illustrative group-by operation and associated control circuitry on a reconfigurable processor. A group-by operation may receive an input tensor and generate an output tensor with histogram values representing a frequency of each bin value in the input tensor.

Compute unit 1220 of the reconfigurable processor may implement the group-by operation, while the input tensor 1215 is stored in memory unit 1210, and the output tensor 1225 is stored in memory unit 1230 of the reconfigurable processor. In some implementations, the reconfigurable processor may be configured to implement control circuitry (e.g., a recording unit that generates control data that is indicative of the size of the output tensor that is stored in output memory unit 1230 and a control unit that communicates the control data to consumers downstream of the output memory unit 1230).

Illustratively, the space allocated for the output tensor 1225 in the output memory unit 1230 is determined by the upper bound of the input tensor length. The initial number of bins (i.e., the histogram length) may be set to one in the output memory unit 1230. In some implementations, the recording unit may be implemented as a memory element in output memory unit 1230 that stores the current number of bins.

The compute unit 1220 may receive the input tensor 1215 from input memory unit 1210 and, for each element in the input tensor 1215, increment the value in the appropriate bin number in the output tensor 1225. If desired, the compute unit 1220 may check whether the bin value is greater than the current number of bins, update the current number of bins if needed (WRITE0 operation 1270), and communicate the updated current number of bins to the output memory unit 1230.

When the compute unit 1220 has finished the group-by operation on the input tensor 1215, the output memory unit 1230 may issue a WRITE0_DONE signal 1275. Upon issuance of the WRITE0_DONE signal 1275, the compute unit 1220 may write the vector bin values 1225 to the output memory unit 1230 (WRITE1 operation 1240). When the WRITE1 operation 1240 finishes, compute unit 1220 and/or output memory unit 1230 may issue a WRITE1_DONE signal 1245.

Upon issuance of the WRITE1_DONE signal 1245, the compute unit 1220 may retrieve the old bin value 1235 during read operations READ1 1250. The read operation READ1 1250 may issue a READ1_DONE signal 1255 when the old bin value 1235 has been transmitted to the compute unit 1220.

Upon issuance of the READ1_DONE signal 1255, the consumers downstream of the output memory unit 1230 may, during read operation READ0 1260, retrieve the current number of bins and the content from the output memory unit 1230 using the current number of bins. When the read operation READ0 1260 has finished, another write operation WRITE0 1270 may start.

Thus, read operation READ0 1260 is blocked by read operation READ1 1250, which in turn is blocked by write operation WRITE1 1240, which is blocked by write operation WRITE0 1270. Thereby, the control circuitry ensures that read operation READ0 uses the actual output size of the output tensor in output memory unit 1230.

Illustratively, the size of output tensor 1225 (i.e., the current number of bins) at the end of the write operation performed by compute unit 1220 may be communicated to all downstream operations.

Figure 13:
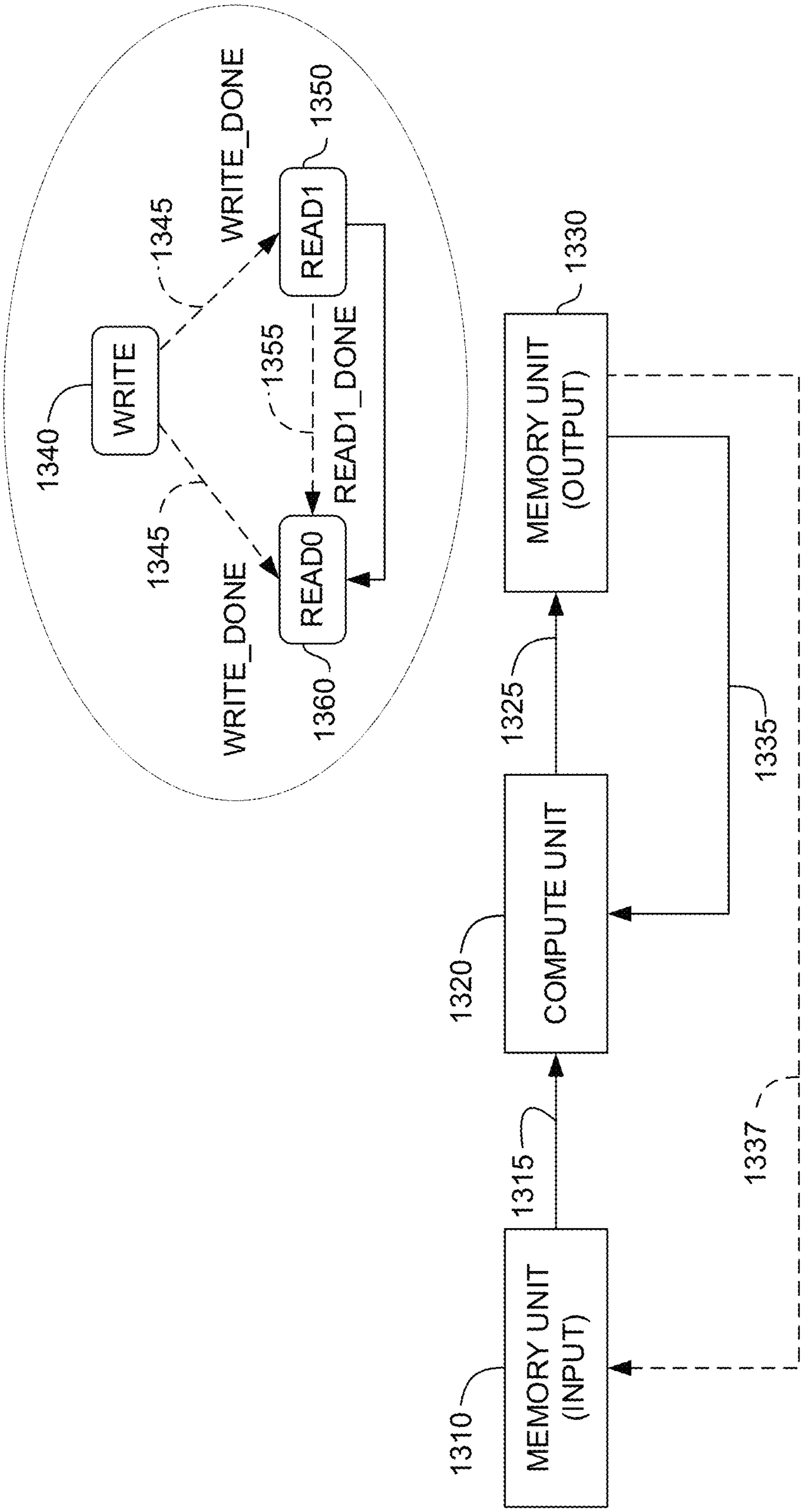
FIG. 13 is a diagram of an illustrative implementation of an illustrative unique operation and associated control circuitry on a reconfigurable processor.

FIG. 13 is a diagram of an illustrative implementation of an illustrative unique operation and associated control circuitry on a reconfigurable processor. A unique operation may receive an input tensor and generate an output tensor with no duplicates.

Illustratively, the unique operation may be implemented together with control circuitry on a reconfigurable processor as shown in FIG. 13. As shown in FIG. 13, the unique operation may be implemented in compute unit 1320 of the reconfigurable processor, while the input tensor is stored in memory unit 1310 and the output tensor is stored in memory unit 1330 of the reconfigurable processor. In some implementations, the reconfigurable processor may be configured to implement control circuitry (e.g., a recording unit that generates control data that is indicative of the size of the output tensor that is stored in output memory unit 1330 and a control unit that communicates the control data to compute units downstream of the output memory unit 1330).

In some implementations, the recording unit may be implemented using counters. For example, consider the scenario in which the input memory unit 1310 stores a statically-sized tensor of a predetermined size. In this scenario, the output memory unit 1330 may maintain a counter with a maximum value that is set to the predetermined size of the input tensor. For example, the output memory unit 1330 may retrieve the predetermined size of the input tensor over connection 1335 from the input memory unit 1310. The counter stride may be set by an external scalar provided by the compute unit 1320.

For example, compute unit 1320 may retrieve input data 1315 from input memory unit 1310. During a write operation 1340, compute unit 1320 may write data 1325 to output memory unit 1330. Simultaneously, the recording unit may store a current counter value in the output memory unit 1330. When the write operation 1340 finishes, compute unit 1320 and/or output memory unit 1330 may issue a WRITE_DONE signal 1345.

Upon issuance of the WRITE_DONE signal 1345, a control unit may perform a read operation READ1 1350 to retrieve the current counter value from the output memory unit 1330 and transmit the current counter value to a compute unit downstream of the output memory unit 1330 for read operation READ0 1360. The read operation READ1 1350 may issue a READ1_DONE signal 1355 when the current counter value has been transmitted to compute unit downstream of the output memory unit 1330.

Upon issuance of the READ1_DONE signal 1355, the compute unit that is downstream of the output memory unit 1330 may, during read operation READ0 1360, retrieve the content of the output memory unit 1330 using the current counter value. When the read operation READ0 1360 has finished, the read operation READ0 1360 may issue a READ0_DONE signal so that another write operation WRITE 1340 may start.

Thus, read operation READ1 1350 is blocked by write operation WRITE 1340, and READ1 1350 blocks read operation READ0 1360. Thereby, the control circuitry ensures that read operation READ0 uses the actual output size of the output tensor in output memory unit 1330.

Illustratively, the size of output data 1325 (i.e., the current counter value) at the end of the write operation performed by compute unit 1320 may be communicated to all downstream operations.

The illustrative operations shown in FIGS. 11, 12, and 13 are parallelizable across multiple compute unit and memory unit streams to trade-off resource usage with throughput. Thereby, each compute unit/memory unit stream of the compute unit and memory unit streams may track the size of its corresponding dynamically-sized output data slice. Furthermore, the control circuitry may be extended to provide support for higher dimensional dynamically-sized output data and enable dynamically tracking each data-dependent loop-bound within the loop nest.

Figure 14:
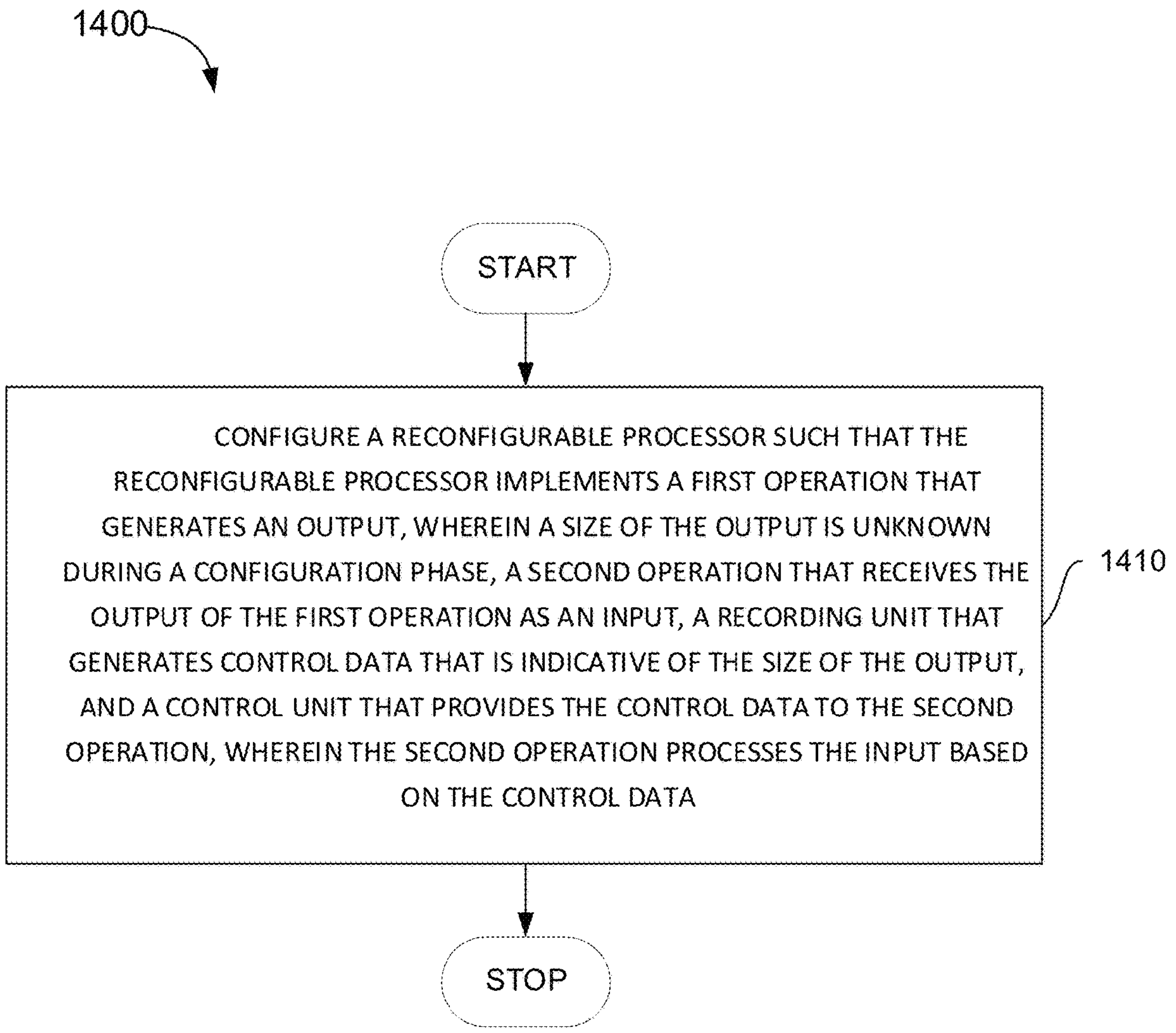
FIG. 14 is a flowchart showing illustrative operations for operating a data processing system with a reconfigurable processor.

FIG. 14 is a flowchart showing illustrative operations 1400 that runtime logic of a host processor may perform for operating a data processing system with a reconfigurable processor. For example, runtime logic of host processor 180 of FIG. 1 may perform operations for operating data processing system 100 with CGR processor 110.

During operation 1410, the runtime logic may configure the reconfigurable processor such that the reconfigurable processor implements a first operation that generates an output, wherein a size of the output is unknown during a configuration phase, a second operation that receives the output of the first operation as an input, a recording unit that generates control data that is indicative of the size of the output, and a control unit that provides the control data to the second operation, wherein the second operation processes the input based on the control data.

For example, the runtime logic may configure the reconfigurable processor 805 of FIG. 8 such that the reconfigurable processor 805 implements a first operation 810, a second operation 820, a recording unit 830, and a control unit 840. The first operation may generate an output 852, whereby a size of the output 852 is unknown during a configuration phase. The second operation 820 may receive the output 852 of the first operation 810 as an input 854. The recording unit may generate control data that is indicative of the size of the output 852, and the control unit 840 may provide the control data to the second operation 820, whereby the second operation processes the input 854 based on the control data.

If desired, the runtime logic may configure the reconfigurable processor such that the reconfigurable processor implements a synchronization unit that informs the second operation when the first operation has generated the output. For example, the runtime logic may configure the reconfigurable processor 805 of FIG. 8 such that the reconfigurable processor 805 implements a synchronization unit 860 that informs the second operation 820 when the first operation 810 has generated the output 852.

In some implementations, the data processing system may include a compiler (e.g., compiler of host processor 180 of FIG. 1). The compiler may generate configuration data for configuring the reconfigurable processor to implement the first operation, the second operation, the recording unit, and the control unit. For example, the compiler may generate configuration data for configuring the reconfigurable processor 805 of FIG. 8 to implement the first operation 810, the second operation 820, the recording unit 830, and the control unit 840.

Illustratively, the output has a number of elements that is smaller than or equal to a predetermined maximum number of elements, and the compiler may generate in the configuration data a first connection for the output and a second connection for the input, whereby each one of the first and second connections is able to transport the predetermined maximum number of elements. For example, the compiler may generate in the configuration data a first connection for the output 852 between the compute unit that implements the first operation of FIG. 8 and the memory unit 850 and a second connection for the input 854 of the second operation, whereby each one of the first and second connections is able to transport the predetermined maximum number of elements.

In some implementations, the data processing system may use runtime logic to program the reconfigurable processor with configuration data.

If desired, a non-transitory computer-readable storage medium includes instructions that, when executed by a processing unit (e.g., runtime logic of host processor 180 of FIG. 1), cause the processing unit to operate a system (e.g., data processing system 100 of FIG. 1) by performing operation 1410 of FIG. 14.

For example, a non-transitory computer-readable storage medium includes instructions that, when executed by a processing unit, cause the processing unit to operate a data processing system that comprises a reconfigurable processor. The instructions include configuring the reconfigurable processor with configuration data such that the reconfigurable processor implements a first operation that generates an output, wherein a size of the output is unknown, a second operation that receives the output of the first operation as an input, a recording unit that generates control data that is indicative of the size of the output, and a control unit that provides the control data to the second operation, wherein the second operation processes the input based on the control data.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms. Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a data processing system for implementing operations that generate a dynamically-sized output. The data processing system comprises a reconfigurable processor configured to implement: a first operation that generates an output, wherein a size of the output is unknown during a configuration phase; a second operation that receives the output of the first operation as an input; a recording unit that generates control data that is indicative of the size of the output; and a control unit that provides the control data to the second operation, wherein the second operation processes the input based on the control data.

In Example 2, the reconfigurable processor of Example 1 comprises arrays of coarse-grained reconfigurable (CGR) units that implement the first and second operations.

In Example 3, the recording unit of Example 1 generates the control data while the first operation generates the output.

In Example 4, the recording unit of Example 3 comprises a counter that counts a number of elements in the output to generate the control data.

In Example 5, the counter of Example 4 increments conditionally on a predicate of the first operation.

In Example 6, the control unit of Example 1 fetches the control data from the recording unit.

In Example 7, the data processing system of Example 6 further comprises external memory that is coupled to the reconfigurable processor, wherein the control unit stores the control data in the external memory, and wherein the second operation retrieves the control data from the external memory.

In Example 8, the reconfigurable processor of Example 1 is further configured to implement a synchronization unit that informs the second operation when the first operation has generated the output.

In Example 9, the reconfigurable processor of Example 1 is further configured to store the output in a buffer during a write operation, and wherein the control unit directs the second operation during a read operation following the write operation to read data as the input from the buffer that was stored during the write operation.

In Example 10, the reconfigurable processor of Example 9 is configured to enable the first operation to write a first portion of the output to a first portion of the buffer, while the second operation reads a first portion of the input that is different than the first portion of the output from a second portion of the buffer that is different than the first portion of the buffer.

In Example 11, the reconfigurable processor of Example 10 is configured to enable the first operation to write, when the first operation has finished writing the first portion of the output and the second operation has finished reading the first portion of the input, a second portion of the output to the second portion of the buffer, while the second operation reads the first portion of the output from the first portion of the buffer as a second portion of the input.

In Example 12, the data processing system of Example 1 further comprises a compiler that generates configuration data for configuring the reconfigurable processor to implement the first operation, the second operation, the recording unit, and the control unit.

In Example 13, the output comprises a number of elements that is smaller than or equal to a predetermined maximum number of elements, and the compiler of Example 12 generates in the configuration data a first connection for the output and a second connection for the input, wherein each one of the first and second connections suitable for a transmission of the predetermined maximum number of elements.

In Example 14, the data processing system of Example 1 further comprises runtime logic that is configured to program the reconfigurable processor with configuration data such that the reconfigurable processor implements the first operation, the second operation, the recording unit, and the control unit.

Example 15 is a method of operating a data processing system that comprises a reconfigurable processor, comprising configuring the reconfigurable processor such that the reconfigurable processor implements: a first operation that generates an output, wherein a size of the output is unknown during a configuration phase, a second operation that receives the output of the first operation as an input, a recording unit that generates control data that is indicative of the size of the output, and a control unit that provides the control data to the second operation, wherein the second operation processes the input based on the control data.

In Example 16, the method of Example 15 further comprises configuring the reconfigurable processor such that the reconfigurable processor implements a synchronization unit that informs the second operation when the first operation has generated the output.

In Example 17, the data processing system of Example 15 further comprises a compiler, and the method further comprises generating, with the compiler, configuration data for configuring the reconfigurable processor to implement the first operation, the second operation, the recording unit, and the control unit.

In Example 18, the output comprises a number of elements that is smaller than or equal to a predetermined maximum number of elements, and the method of Example 17 further comprises generating, with the compiler, in the configuration data a first connection for the output and a second connection for the input, wherein each one of the first and second connections is able to transport the predetermined maximum number of elements.

In Example 19, the data processing system of Example 15 further comprises runtime logic, and wherein configuring the reconfigurable processor further comprises: programming, with the runtime logic, the reconfigurable processor with configuration data.

Example 20 is a non-transitory computer-readable storage medium including instructions that, when executed by a processing unit, cause the processing unit to operate a data processing system that comprises a reconfigurable processor, the instructions comprising: configuring the reconfigurable processor with configuration data such that the reconfigurable processor implements: a first operation that generates an output, wherein a size of the output is unknown, a second operation that receives the output of the first operation as an input, a recording unit that generates control data that is indicative of the size of the output, and a control unit that provides the control data to the second operation, wherein the second operation processes the input based on the control data.

Example 21 is a data processing system for implementing operations that generate a dynamically-sized output, comprising: a reconfigurable processor configured to: implement a first operation that generates an output, wherein a size of the output is unknown during a configuration phase; implement a second operation that receives the output of the first operation as an input; and wherein, during a write operation, the first operation is enabled to write a first portion of the output to a first portion of a buffer, while the second operation reads a first portion of the input that is different than the first portion of the output from a second portion of the buffer that is different than the first portion of the buffer; and control circuitry, comprising: a control unit that: directs the second operation during a read operation following the write operation to read data as the input from the buffer that was stored during the write operation.

In Example 22, the reconfigurable processor of Example 21 comprises arrays of coarse-grained reconfigurable (CGR) units that implement the first and second operations.

In Example 23, the control circuitry of Example 21 further comprises a recording unit that generates control data that is indicative of the size of the output.

In Example 24, the recording unit of Example 23 generates the control data while the first operation generates the output.

In Example 25, the recording unit of Example 24 comprises a counter that counts a number of elements in the output to generate the control data.

In Example 26, the counter of Example 25 increments conditionally based on a predicate of the first operation.

In Example 27, the control unit of Example 23 fetches the control data from the recording unit.

In Example 28, the control unit of Example 27 provides the control data to the second operation, wherein the second operation processes the input based on the control data.

In Example 29, the data processing system of Example 27, further comprises external memory that is coupled to the reconfigurable processor, wherein the control unit stores the control data in the external memory, and wherein the second operation retrieves the control data from the external memory.

In Example 30, the control circuitry of Example 21 further comprises a synchronization unit that sends a signal to the second operation when the first operation has generated the output.

In Example 31, the reconfigurable processor of Example 30 is configured to enable the first operation to write, when the first operation has finished writing the first portion of the output and the second operation has finished reading the first portion of the input, a second portion of the output to the second portion of the buffer, while the second operation reads the first portion of the output from the first portion of the buffer as a second portion of the input.

In Example 32, the data processing system of Example 21, further comprises a compiler that generates configuration data for configuring the reconfigurable processor to implement the first operation, the second operation, and the control circuitry.

In Example 33, the output comprises a number of elements that is smaller than or equal to a predetermined maximum number of elements, and wherein the compiler of Example 32 generates in the configuration data a first connection for the output and a second connection for the input, wherein each one of the first and second connections is suitable for a transmission of the predetermined maximum number of elements.

In Example 34, the data processing system of Example 21, further comprises runtime logic that is configured to program the reconfigurable processor with configuration data such that the reconfigurable processor implements the first operation, the second operation, and the control circuitry.

Example 35 is a method of operating a data processing system that comprises a reconfigurable processor, comprising: configuring the reconfigurable processor such that the reconfigurable processor implements: a first operation that generates an output, wherein a size of the output is unknown during a configuration phase, a second operation that receives the output of the first operation as an input, a write operation that stores the output in a buffer, wherein the first operation is enabled to write a first portion of the output to a first portion of the buffer, while the second operation reads a first portion of the input that is different than the first portion of the output from a second portion of the buffer that is different than the first portion of the buffer, and control circuitry that comprises a control unit that directs the second operation during a read operation following the write operation to read data as the input from the buffer that was stored during the write operation.

In Example 36, the method of Example 35, further comprises configuring the reconfigurable processor such that the control circuitry further comprises a recording unit that generates control data that is indicative of the size of the output, wherein the control unit provides the control data to the second operation, and wherein the second operation processes the input based on the control data; and a synchronization unit that sends a signal to the second operation when the first operation has generated the output.

In Example 37, the data processing system of Example 35 further comprises a compiler, the method further comprising: generating, with the compiler, configuration data for configuring the reconfigurable processor to implement the first operation, the second operation, and the control circuitry.

In Example 38, the output comprises a number of elements that is smaller than or equal to a predetermined maximum number of elements, the method of Example 37 further comprising: generating, with the compiler, in the configuration data a first connection for the output and a second connection for the input, wherein each one of the first and second connections is able to transport the predetermined maximum number of elements.

In Example 39, the data processing system of Example 37 further comprises runtime logic, and wherein configuring the reconfigurable processor further comprises programming, with the runtime logic, the reconfigurable processor with the configuration data.

Example 40 is a non-transitory computer-readable storage medium including instructions that, when executed by a processing unit, cause the processing unit to operate a data processing system that comprises a reconfigurable processor, the instructions comprising: configuring the reconfigurable processor with configuration data such that the reconfigurable processor implements: a first operation that generates an output, wherein a size of the output is unknown, a second operation that receives the output of the first operation as an input, a write operation that stores the output in a buffer, wherein the first operation is enabled to write a first portion of the output to a first portion of the buffer, while the second operation reads a first portion of the input that is different than the first portion of the output from a second portion of the buffer that is different than the first portion of the buffer, and control circuitry that comprises a control unit that directs the second operation during a read operation following the write operation to read data as the input from the buffer that was stored during the write operation.

What is claimed is:

1. A data processing system for implementing operations that generate a dynamically-sized output, comprising:
- a reconfigurable processor configured to:
  - implement a first operation that generates an output, wherein a size of the output is unknown during a configuration phase;
  - implement a second operation that receives the output of the first operation as an input; and
  - wherein, during a write operation, the first operation is enabled to write a first portion of the output to a first portion of a buffer, while the second operation reads a first portion of the input that is different than the first portion of the output from a second portion of the buffer that is different than the first portion of the buffer; and
- control circuitry, comprising:
  - a control unit circuitry that:
  - directs the second operation during a read operation following the write operation to read data as the input from the buffer that was stored during the write operation.

2. The data processing system of claim 1, wherein the reconfigurable processor comprises arrays of coarse-grained reconfigurable (CGR) units that implement the first and second operations.

3. The data processing system of claim 1, wherein the control circuitry further comprises:
- a recording unit circuitry that generates control data that is indicative of the size of the output.

4. The data processing system of claim 3, wherein the recording unit generates the control data while the first operation generates the output.

5. The data processing system of claim 4, wherein the recording unit comprises:
- a counter that counts a number of elements in the output to generate the control data.

6. The data processing system of claim 5, wherein the counter increments conditionally based on a predicate of the first operation.

7. The data processing system of claim 3, wherein the control unit fetches the control data from the recording unit.

8. The data processing system of claim 7, wherein the control unit provides the control data to the second operation, wherein the second operation processes the input based on the control data.

9. The data processing system of claim 7, further comprising:
- external memory that is coupled to the reconfigurable processor, wherein the control unit stores the control data in the external memory, and wherein the second operation retrieves the control data from the external memory.

10. The data processing system of claim 1, wherein the control circuitry further comprises:
- a synchronization unit circuitry that sends a signal to the second operation when the first operation has generated the output.

11. The data processing system of claim 10, wherein the reconfigurable processor is configured to enable the first operation to write, when the first operation has finished writing the first portion of the output and the second operation has finished reading the first portion of the input, a second portion of the output to the second portion of the buffer, while the second operation reads the first portion of the output from the first portion of the buffer as a second portion of the input.

12. The data processing system of claim 1, further comprising:

a compiler that generates configuration data for configuring the reconfigurable processor to implement the first operation, the second operation, and the control circuitry.

13. The data processing system of claim 12, wherein the output comprises a number of elements that is smaller than or equal to a predetermined maximum number of elements, and wherein the compiler generates in the configuration data a first connection for the output and a second connection for the input, wherein each one of the first and second connections is suitable for a transmission of the predetermined maximum number of elements.

14. The data processing system of claim 1, further comprising:

runtime logic that is configured to program the reconfigurable processor with configuration data such that the reconfigurable processor implements the first operation, the second operation, and the control circuitry.

15. A method of operating a data processing system that comprises a reconfigurable processor, comprising:

configuring the reconfigurable processor such that the reconfigurable processor implements:

a first operation that generates an output, wherein a size of the output is unknown during a configuration phase, a second operation that receives the output of the first operation as an input, a write operation that stores the output in a buffer, wherein the first operation is enabled to write a first portion of the output to a first portion of the buffer, while the second operation reads a first portion of the input that is different than the first portion of the output from a second portion of the buffer that is different than the first portion of the buffer, and control circuitry that comprises:

a control unit circuitry that directs the second operation during a read operation following the write operation to read data as the input from the buffer that was stored during the write operation.

16. The method of claim 15, further comprising:

configuring the reconfigurable processor such that the control circuitry further comprises:

a recording unit circuitry that generates control data that is indicative of the size of the output, wherein the control unit circuitry provides the control data to the second operation, and wherein the second operation processes the input based on the control data; and a synchronization unit circuitry that sends a signal to the second operation when the first operation has generated the output.

17. The method of claim 15, wherein the data processing system further comprises a compiler, further comprising:

generating, with the compiler, configuration data for configuring the reconfigurable processor to implement the first operation, the second operation, and the control circuitry.

18. The method of claim 17, wherein the output comprises a number of elements that is smaller than or equal to a predetermined maximum number of elements, the method further comprising:

generating, with the compiler, in the configuration data a first connection for the output and a second connection for the input, wherein each one of the first and second connections is able to transport the predetermined maximum number of elements.

19. The method of claim 17, wherein the data processing system further comprises runtime logic, and wherein configuring the reconfigurable processor further comprises:

programming, with the runtime logic, the reconfigurable processor with the configuration data.

20. A non-transitory computer-readable storage medium including instructions that, when executed by a processing unit, cause the processing unit to operate a data processing system that comprises a reconfigurable processor, the instructions comprising:

configuring the reconfigurable processor with configuration data such that the reconfigurable processor implements:

a first operation that generates an output, wherein a size of the output is unknown, a second operation that receives the output of the first operation as an input, a write operation that stores the output in a buffer, wherein the first operation is enabled to write a first portion of the output to a first portion of the buffer, while the second operation reads a first portion of the input that is different than the first portion of the output from a second portion of the buffer that is different than the first portion of the buffer, and control circuitry that comprises a control unit circuitry that directs the second operation during a read operation following the write operation to read data as the input from the buffer that was stored during the write operation.

* * * * *